US011061796B2

(12) United States Patent
Harutyunyan et al.

(10) Patent No.: US 11,061,796 B2
(45) Date of Patent: Jul. 13, 2021

(54) PROCESSES AND SYSTEMS THAT DETECT OBJECT ABNORMALITIES IN A DISTRIBUTED COMPUTING SYSTEM

(71) Applicant: VMware, Inc., Palo Alto, CA (US)

(72) Inventors: Ashot Nshan Harutyunyan, Yerevan (AM); Naira Movses Grigoryan, Yerevan (AM); Arnak Poghosyan, Yerevan (AM); Nicholas Kushmerick, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/279,043

(22) Filed: Feb. 19, 2019

(65) Prior Publication Data

US 2020/0264965 A1   Aug. 20, 2020

(51) Int. Cl.
| | |
|---|---|
| *H04L 12/24* | (2006.01) |
| *G06F 11/30* | (2006.01) |
| *G06F 11/34* | (2006.01) |
| *G06N 20/00* | (2019.01) |
| *G06F 17/16* | (2006.01) |
| *H04L 12/26* | (2006.01) |

(52) U.S. Cl.
CPC ...... *G06F 11/3452* (2013.01); *G06F 11/3419* (2013.01); *G06F 11/3495* (2013.01); *G06F 17/16* (2013.01); *G06N 20/00* (2019.01); *H04L 41/142* (2013.01); *H04L 43/067* (2013.01); *G06F 11/3006* (2013.01); *G06F 2201/835* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,949,677 | B1* | 2/2015 | Brundage | G06F 11/0745 714/48 |
| 2014/0179270 | A1* | 6/2014 | Anand | H04W 12/12 455/410 |
| 2016/0350173 | A1* | 12/2016 | Ahad | H04L 67/02 |
| 2016/0352767 | A1* | 12/2016 | Owhadi | H04L 63/1416 |
| 2016/0359695 | A1* | 12/2016 | Yadav | H04L 43/04 |
| 2018/0225391 | A1* | 8/2018 | Sali | G06N 20/00 |
| 2019/0087737 | A1* | 3/2019 | Pendar | G06F 17/18 |
| 2019/0147300 | A1* | 5/2019 | Bathen | G06N 3/0454 706/12 |
| 2020/0007563 | A1* | 1/2020 | Leibman | G06K 9/6219 |

\* cited by examiner

*Primary Examiner* — Viet D Vu

(57) ABSTRACT

Computational processes and systems are directed to detecting abnormally behaving objects of a distributed computing system. An object can be a physical or a virtual object, such as a server computer, application, VM, virtual network device, or container. Processes and systems identify a set of metrics associated with an object and compute an indicator metric from the set of metrics. The indicator metric is used to label time stamps that correspond to outlier metric values of the set of metrics. The metrics and outlier time stamps are used to compute rules by machine learning. Each rule corresponds to a subset or combination of metrics and represents specific threshold conditions for metric values. The rules are applied to run-time metric data of the metrics to detect run-time abnormal behavior of the object.

21 Claims, 30 Drawing Sheets

$$\begin{bmatrix} \operatorname{corr}(v_1,v_1) & \operatorname{corr}(v_1,v_2) & \operatorname{corr}(v_1,v_3) & \cdots & \operatorname{corr}(v_1,v_M) \\ \operatorname{corr}(v_2,v_1) & \operatorname{corr}(v_2,v_2) & \operatorname{corr}(v_2,v_3) & \cdots & \operatorname{corr}(v_2,v_M) \\ \operatorname{corr}(v_3,v_1) & \operatorname{corr}(v_3,v_2) & \operatorname{corr}(v_3,v_3) & \cdots & \operatorname{corr}(v_3,v_M) \\ \vdots & \vdots & \vdots & & \vdots \\ \operatorname{corr}(v_M,v_1) & \operatorname{corr}(v_M,v_2) & \operatorname{corr}(v_M,v_3) & \cdots & \operatorname{corr}(v_M,v_M) \end{bmatrix}$$

FIG. 17

$$\begin{bmatrix} C_1 & C_2 & \cdots & C_M \end{bmatrix} = QR = \begin{bmatrix} Q_1 & Q_2 & \cdots & Q_M \end{bmatrix} \begin{bmatrix} r_{11} & r_{12} & r_{13} & \cdots & r_{1M} \\ 0 & r_{22} & r_{23} & \cdots & r_{2M} \\ 0 & 0 & r_{33} & \cdots & r_{3M} \\ \vdots & \vdots & \vdots & & \vdots \\ 0 & 0 & 0 & \cdots & r_{MM} \end{bmatrix}$$

FIG. 18

PROCESSES AND SYSTEMS THAT DETECT OBJECT ABNORMALITIES IN A DISTRIBUTED COMPUTING SYSTEM

TECHNICAL FIELD

This disclosure is directed to processes and systems that detect abnormal behavior of objects of a distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with numerous components that provide enormous computational bandwidths and data-storage capacities. These large, distributed computing systems are made possible by advances in computer networking, distributed operating systems and applications, data-storage appliances, computer hardware, and software technologies.

Because distributed computing systems have an enormous number of computational resources, various management systems have been developed to collect performance information about these resources. For example, a typical management system may collect hundreds of thousands of streams of metric data to monitor various computational resources of a data center infrastructure. Each data point of a stream of metric data may represent an amount of the resource in use at a point in time. However, the enormous number of metric data streams received by a management system makes it impossible for information technology ("IT") administrators to manually monitor the metrics, detect performance issues, and respond in real time to performance issues. Failure to respond in real time to performance problems can interrupt computer services and have enormous cost implications for data center tenants, such as when a tenant's server applications stop running or fail to timely respond to client requests.

SUMMARY

Computational processes and systems described herein are directed to detecting abnormally behaving objects of a distributed computing system. An object can be a physical or a virtual object, such as a server computer, network device, application, VM, virtual network device, container, or any other physical or virtual object of a distributed computing system for which metrics can be collected to evaluate abnormal or normal behavior of the object. Processes and systems identify a set of metrics comprising metrics associated with resources used by the object and metrics characterizing performance and other properties of the object. Each metric comprises a sequence of time series metric data. Processes and systems compute an indicator metric from the set of metrics and use the indicator metric to label time stamps that correspond to outlier metric values of the set of metrics. The set of metrics and outlier time stamps are used to compute rules using machine learning. Each rule corresponds to a subset or combination of metrics and represents specific threshold conditions for metric values. The rules are applied to run-time metric data of the metrics to detect run-time abnormal behavior of the object. Processes and systems may execute remedial measures to correct the abnormal behavior of the object.

DESCRIPTION OF THE DRAWINGS

FIG. 17 shows an example correlation matrix for M metrics.
FIG. 18 shows QR decomposition applied to the correlation matrix shown in FIG. 17.

DETAILED DESCRIPTION

This disclosure is directed to computational processes and systems to detect abnormal behavior exhibited by physical and virtual objects of a distributed computing system. In a first subsection, computer hardware, complex computational systems, and virtualization are described. Processes and systems for detecting abnormally behaving objects of a distributed computing system are described below in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that "software implemented" functionality is provided. The digitally encoded computer instructions are a physical control component of processor-controlled machines and devices. Multi-cloud aggregations, cloud-computing services, virtual-machine containers and virtual machines, containers, communications interfaces, and many of the other topics discussed below are tangible, physical components of physical, electro-optical-mechanical computer systems.

Figure 1:
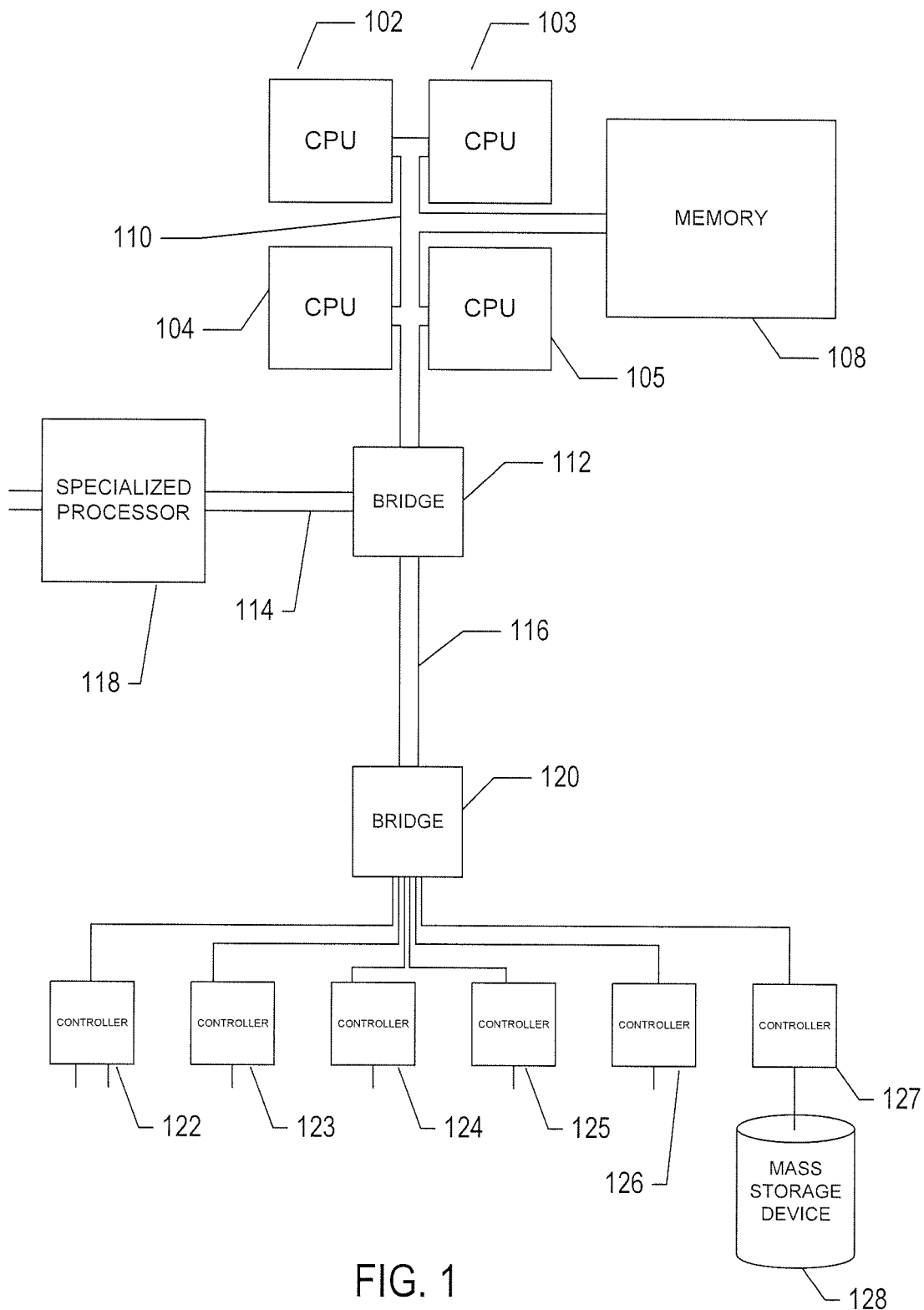
FIG. 1 shows an architectural diagram for various types of computers.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
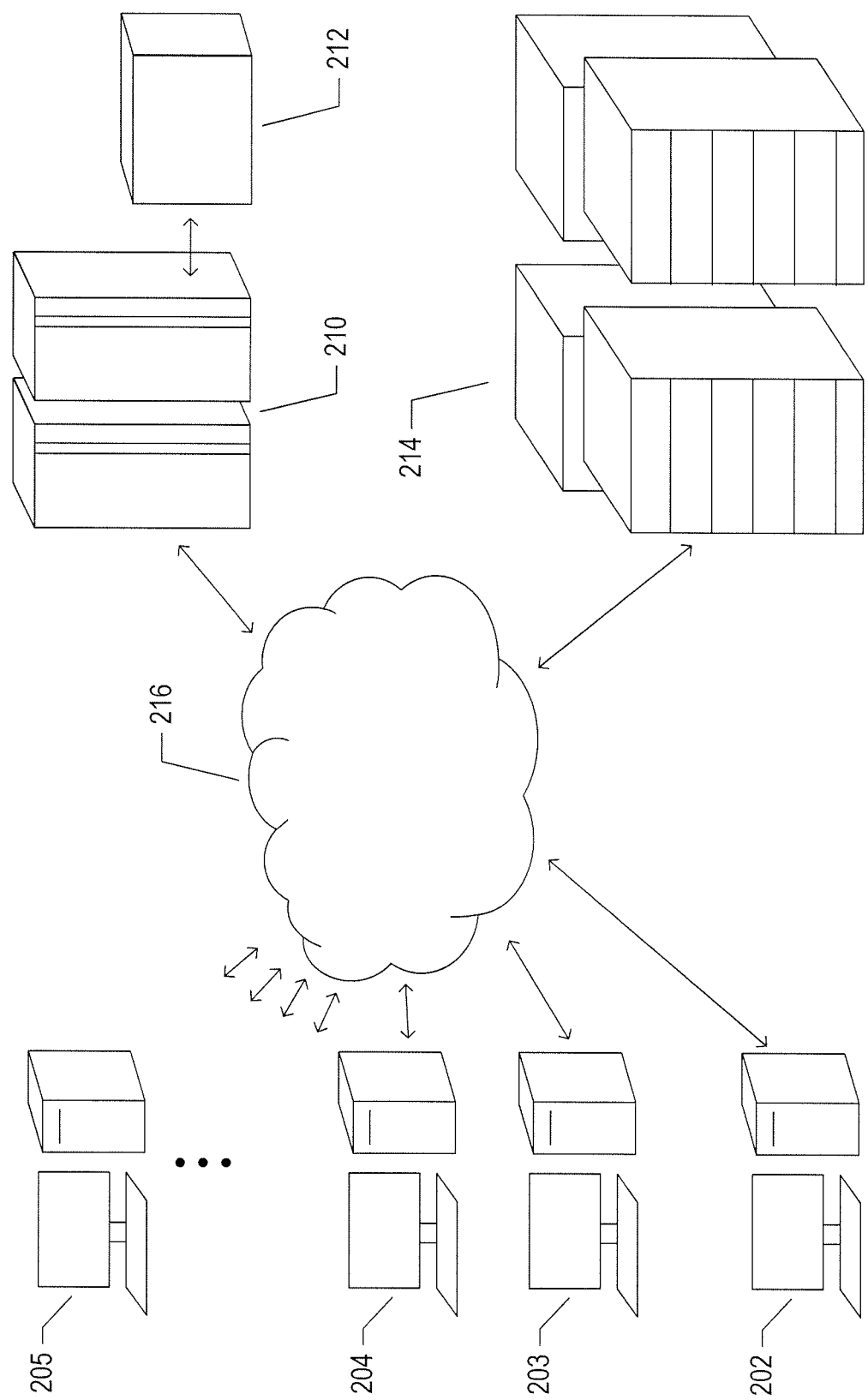
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which many PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
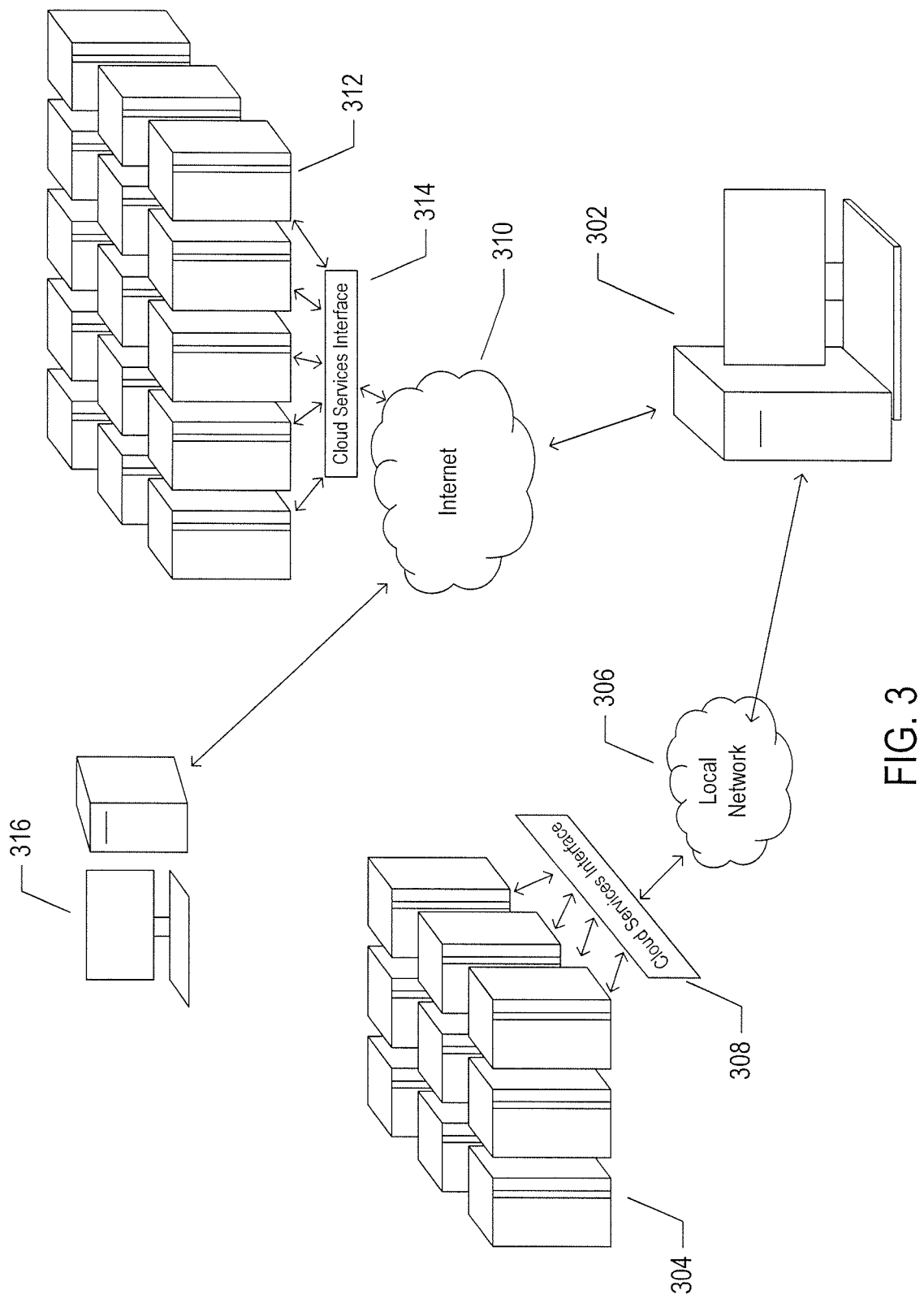
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
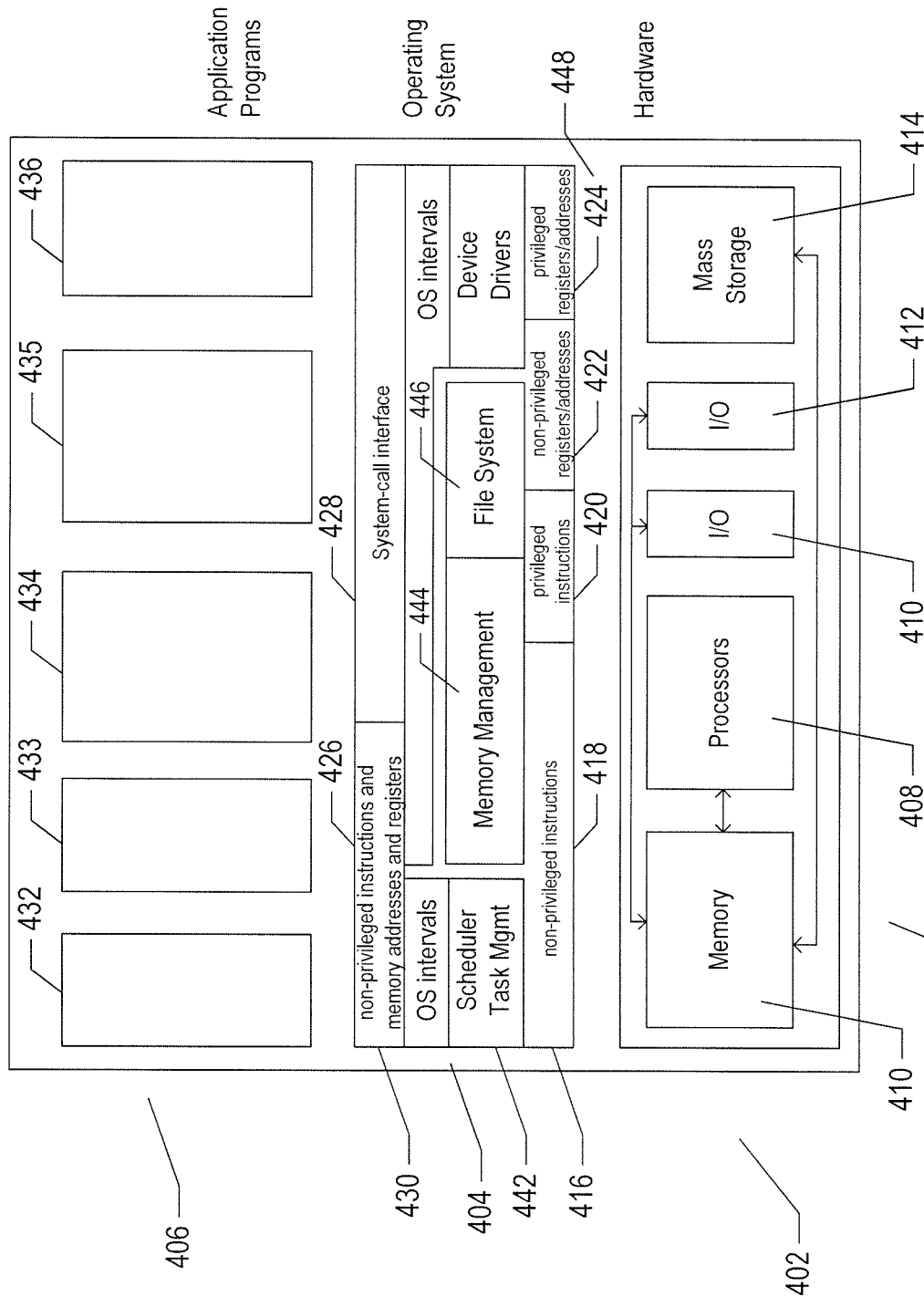
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
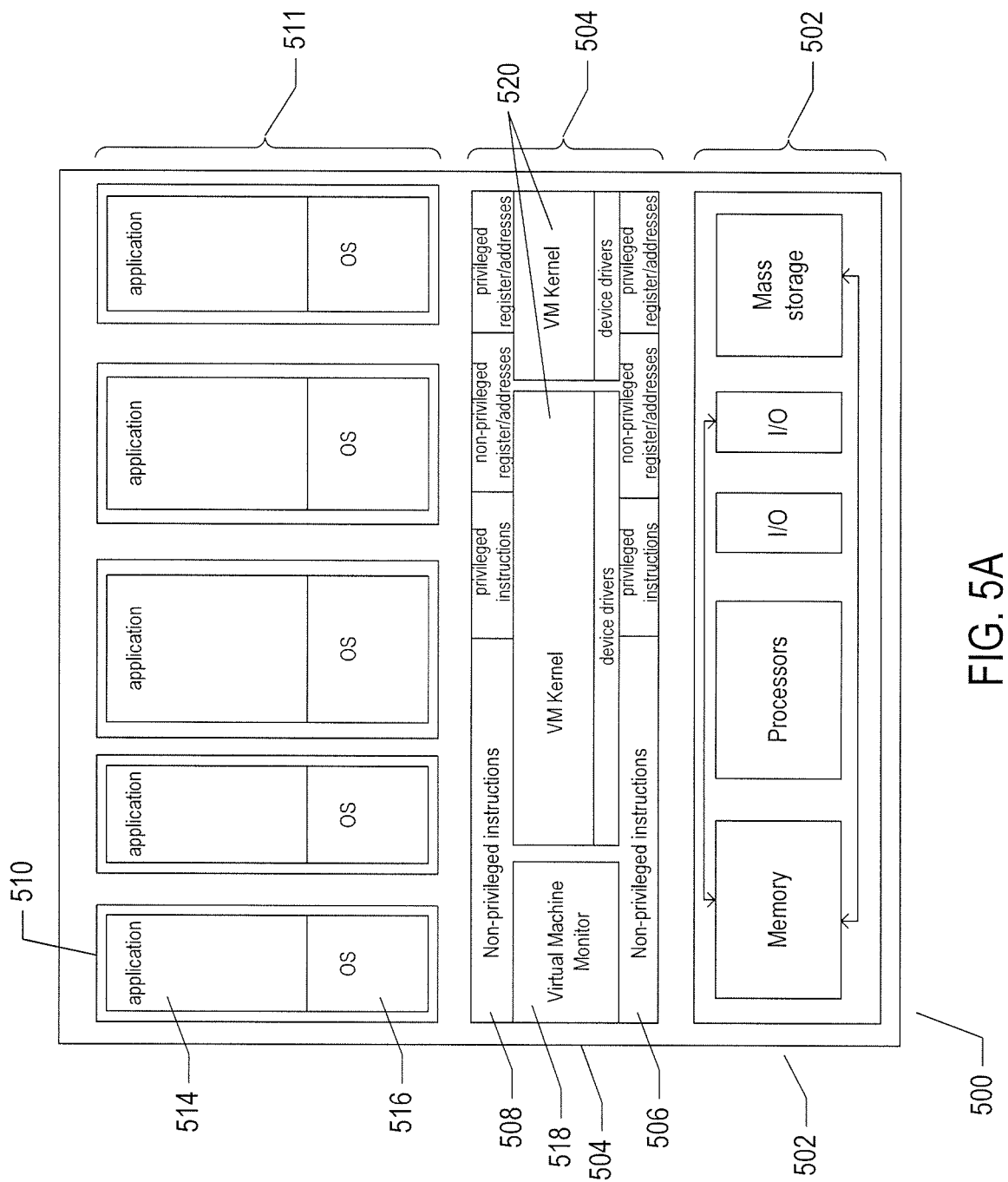
FIGS. 5A-5B show two types of virtual machine ("VM") and VM execution environments.
Figure 5B:
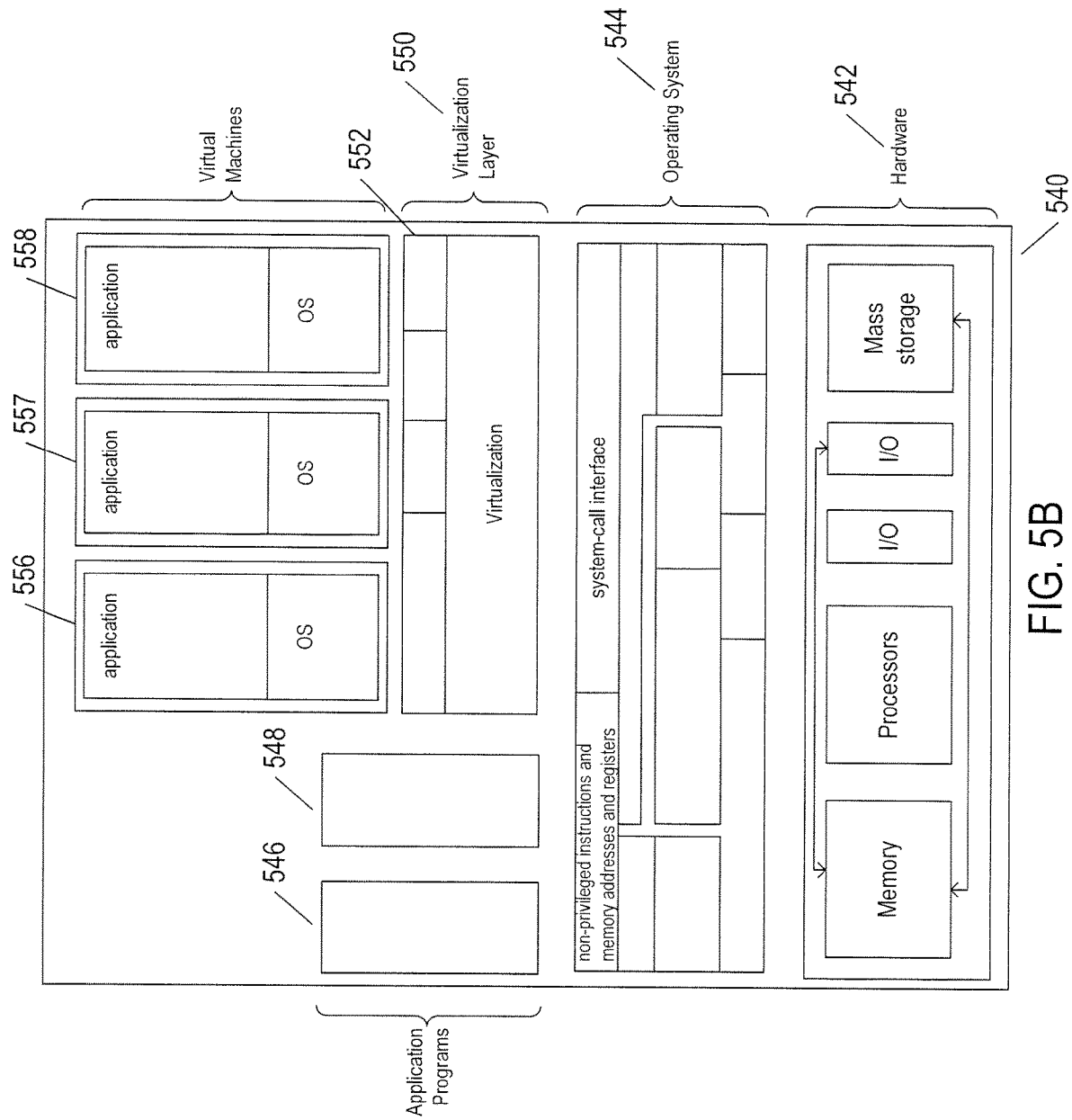

For the above reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
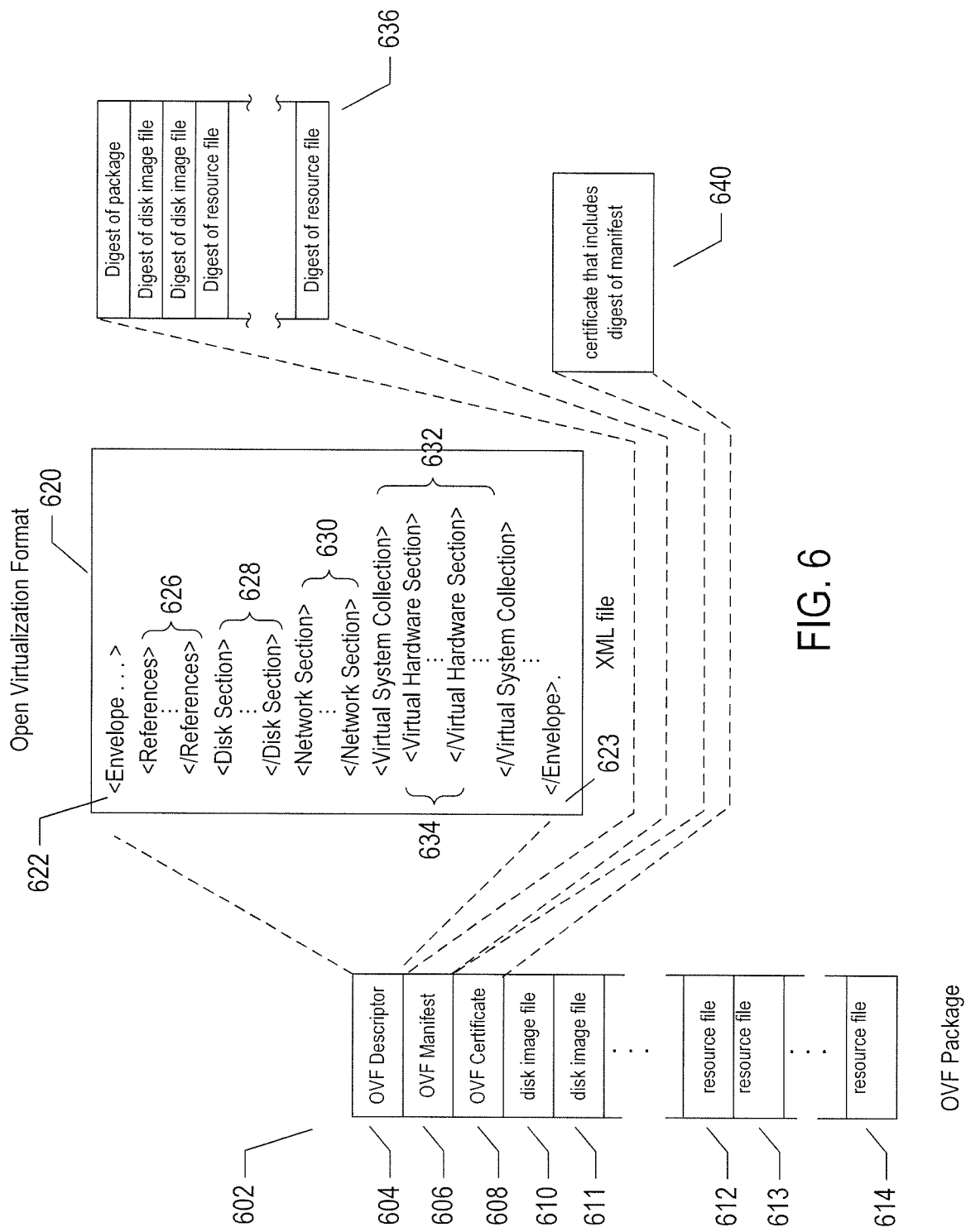
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
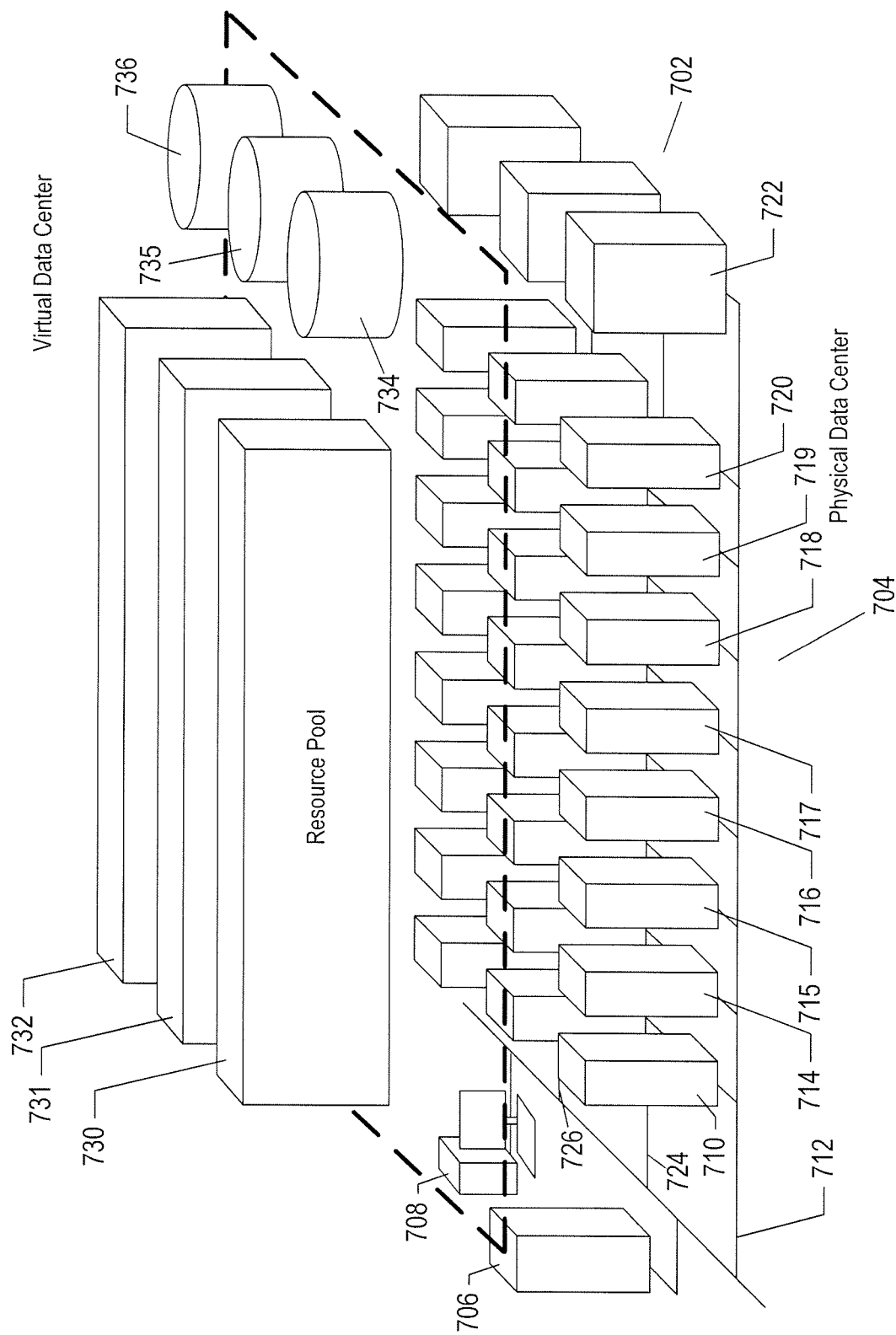
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
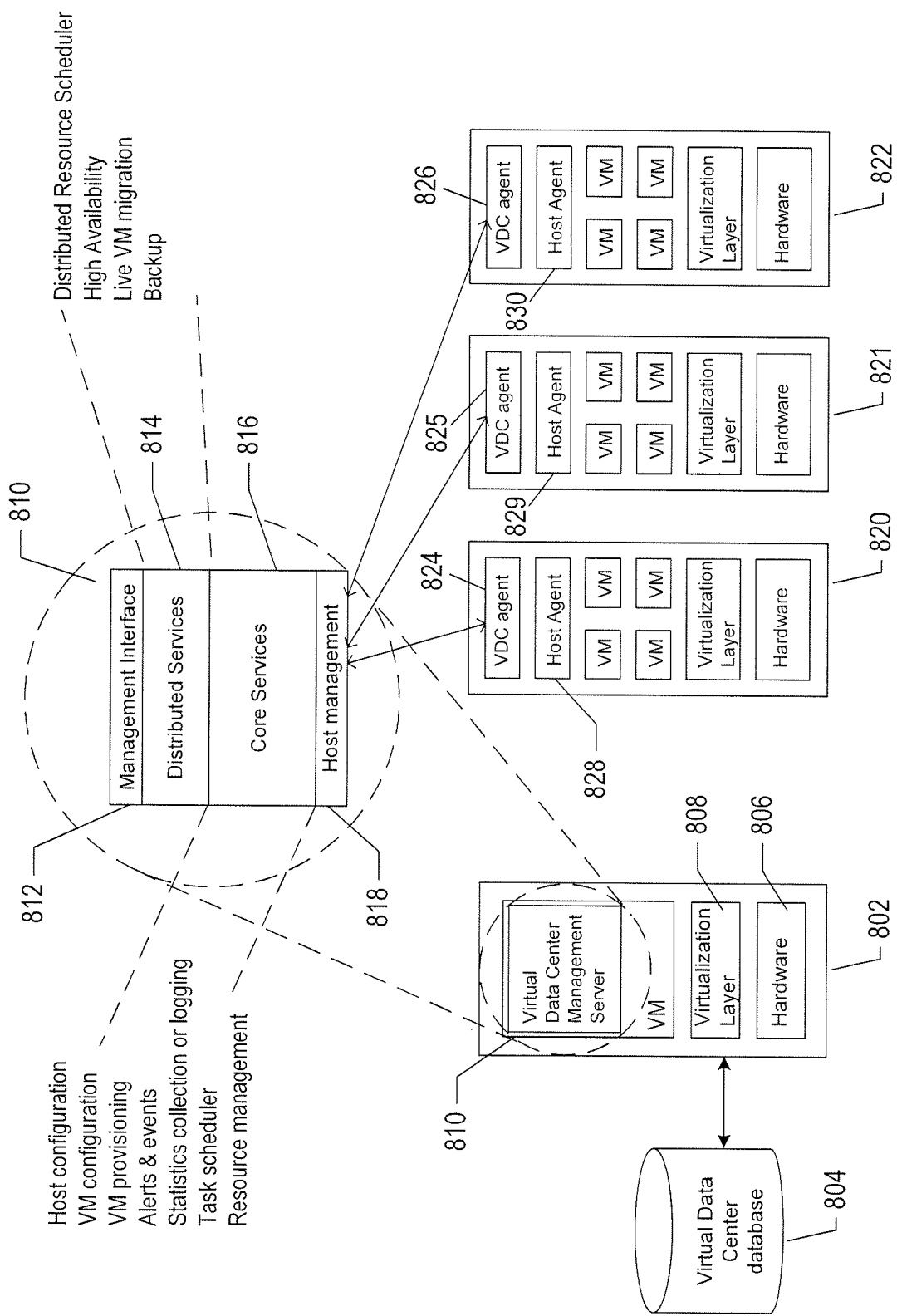
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808 and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to cavy out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
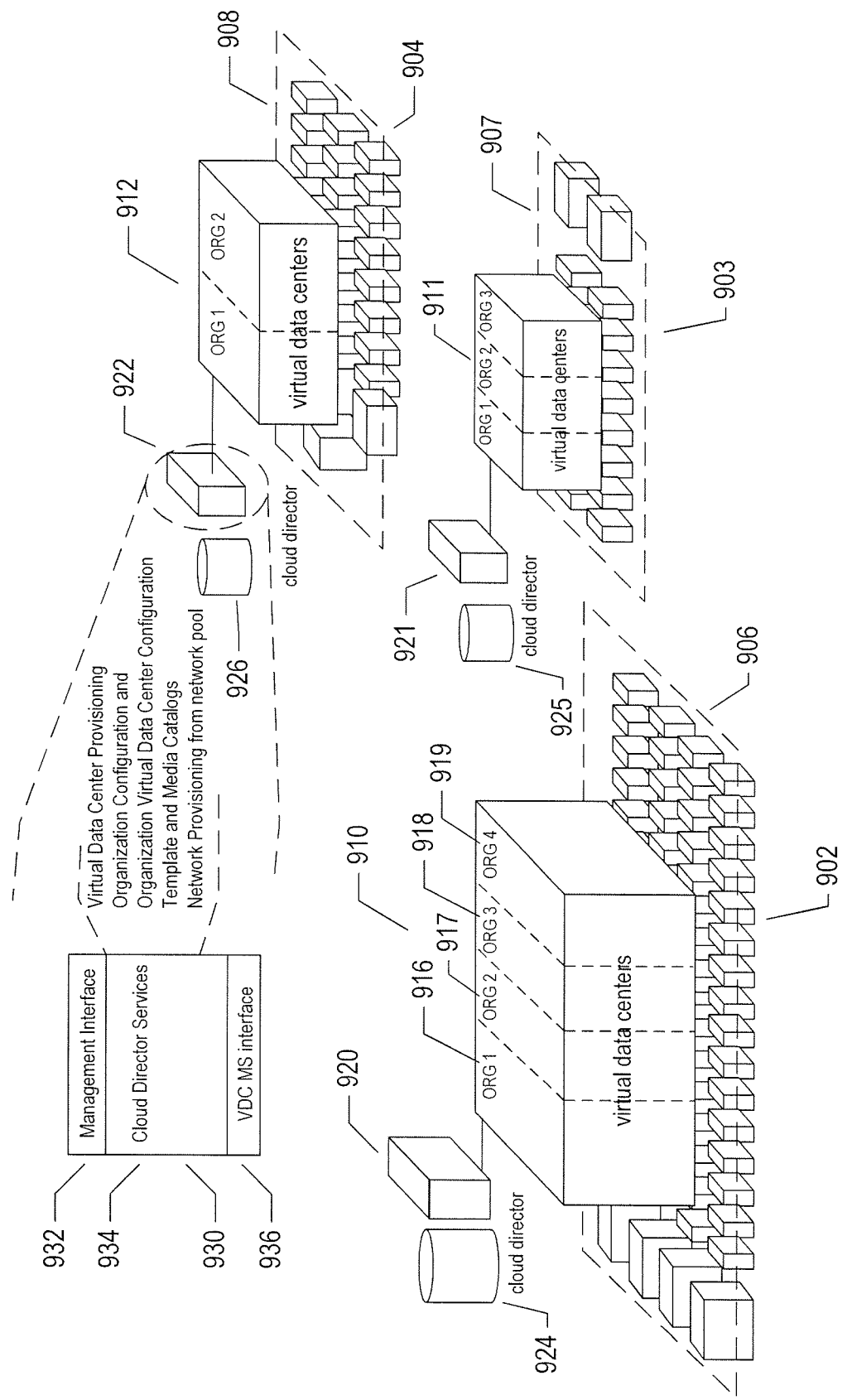
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
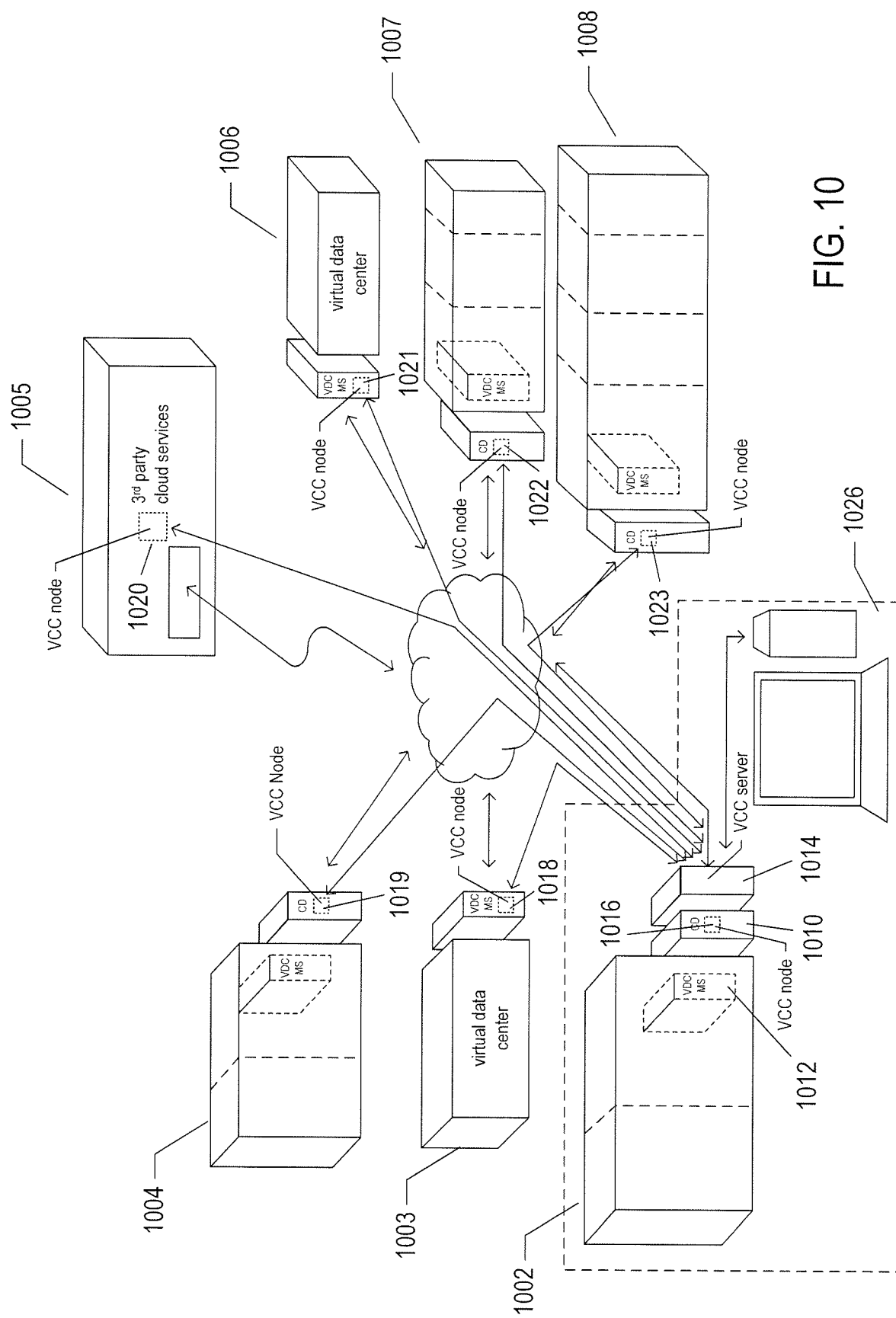
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
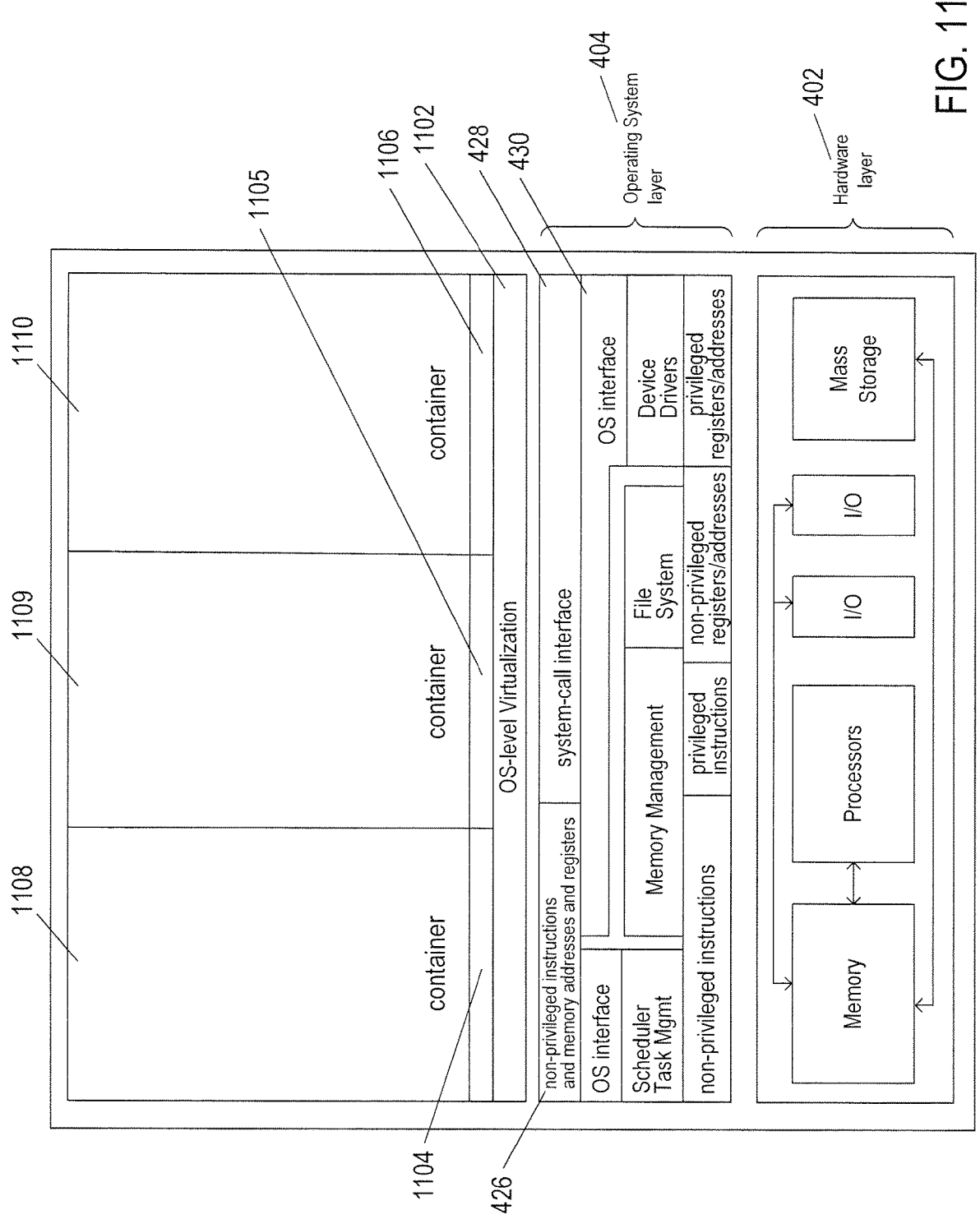
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
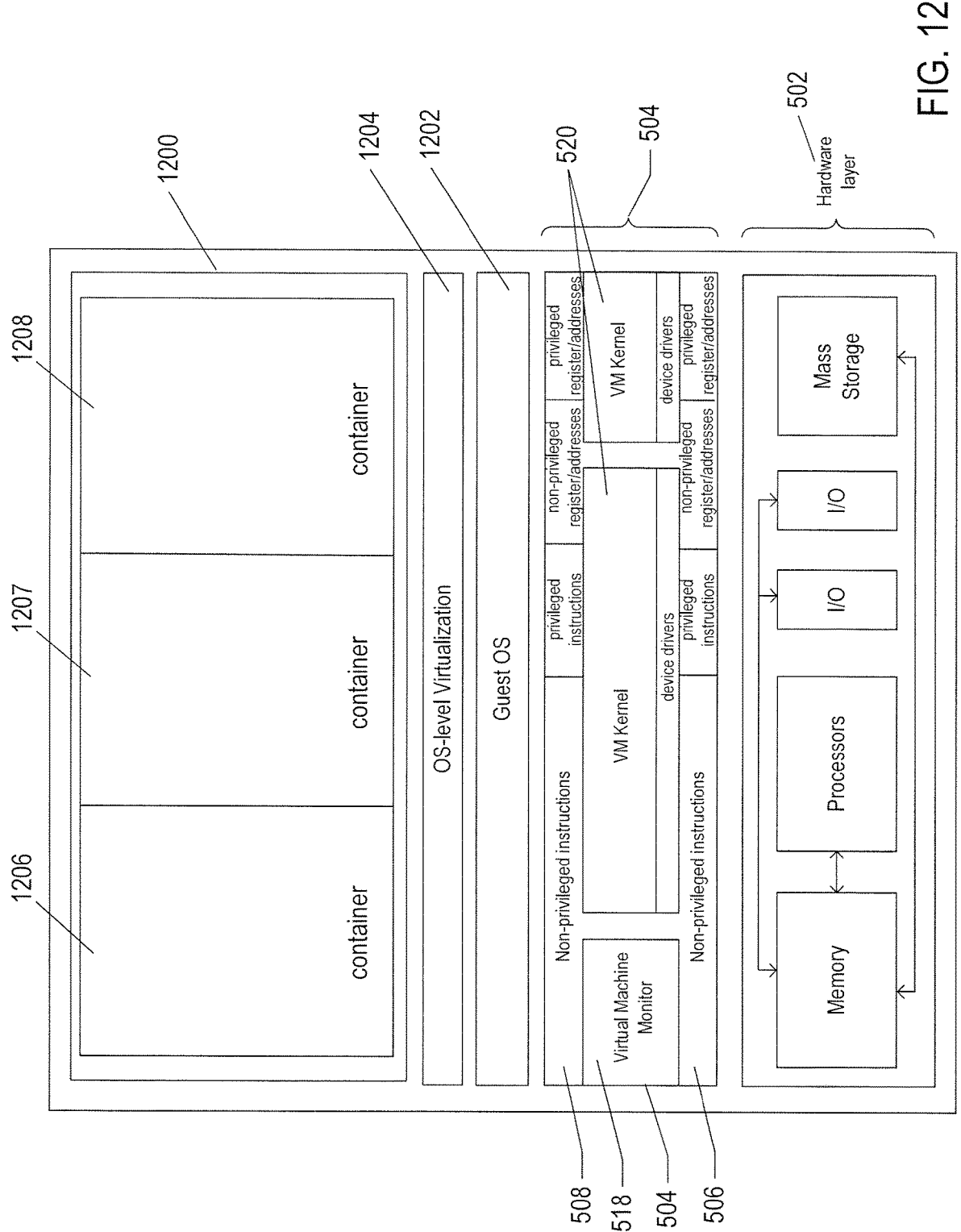
FIG. 12 shows an approach to implementing containers on a VM.

FIG. 12 shows an approach to implementing the containers on a VM. FIG. 12 shows a host computer similar to the host computer shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Figure 13:
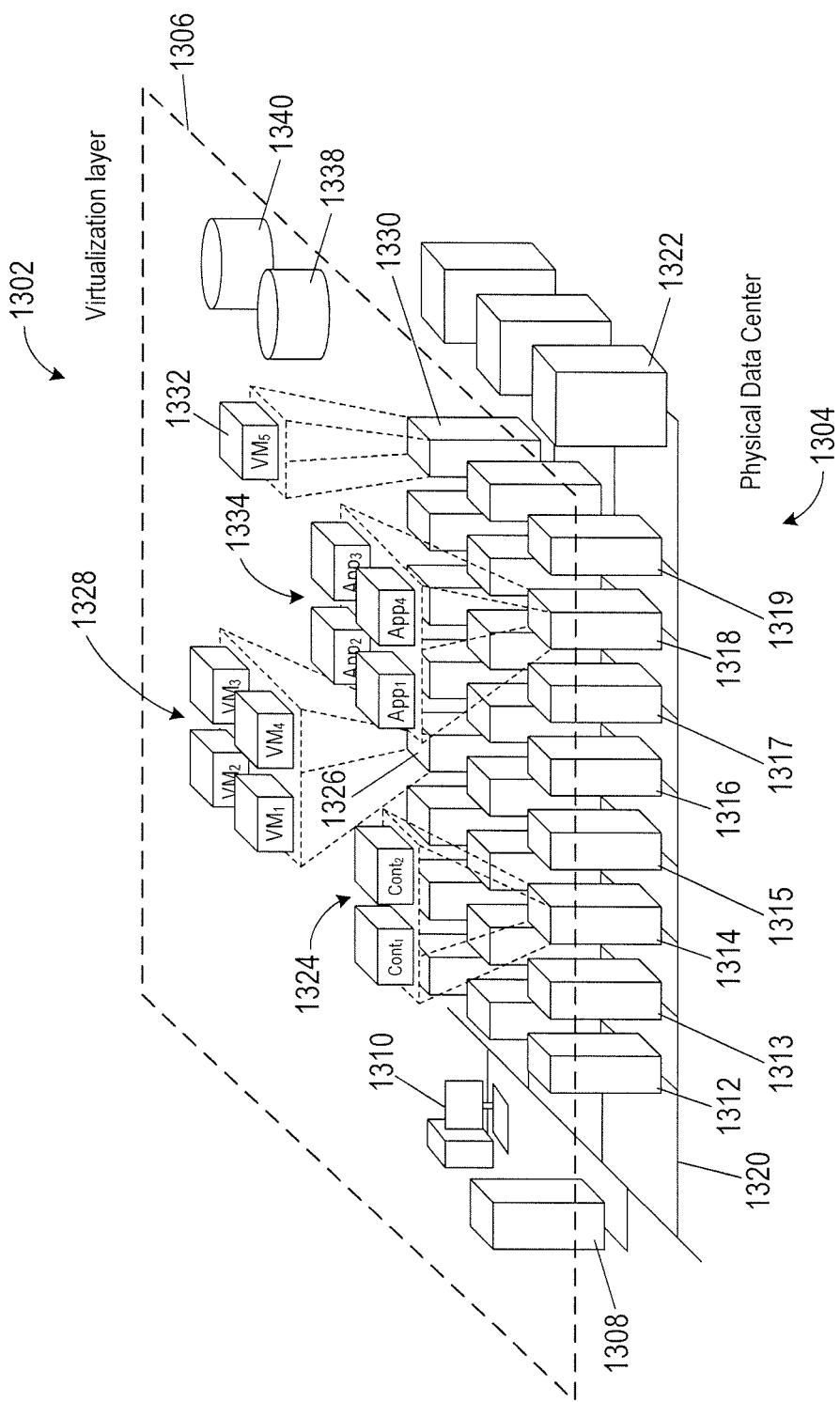
FIG. 13 shows an example of a virtualization layer located above a physical data center.

Processes and Systems for Detecting Abnormally Behaving Objects of a Distributed Computing System FIG. 13 shows an example of a virtualization layer 1302 located above a physical data center 1304. For the sake of illustration, the virtualization layer 1302 is separated from the physical data center 1304 by a virtual-interface plane 1306. The physical data center 1304 is an example of a distributed computing system. The physical data center 1304 comprises physical objects, including a management server computer 1308, any of various computers, such as PC 1310, on which a virtual-data-center ("VDC") management interface may be displayed to system administrators and other users, server computers, such as server computers 1312-1319, data-storage devices, and network devices. The server computers may be networked together to form area networks within the data center 1904. The example physical data center 1304 includes three area networks that each directly interconnects a bank of eight server computers and a mass-storage array. For example, area network 1320 interconnects server computers 1312-1319 and a mass-storage array 1322. Different physical data centers may include many different types of computers, networks, data-storage systems and devices connected according to many different types of connection topologies. The virtualization layer 1302 includes virtual objects, such as VMs, applications, and containers, hosted by the server computers in the physical data center 1304. The virtualization layer 1302 may also include a virtual network (not illustrated) of virtual switches, routers, load balancers, and network interface cards formed from the physical switches, routers, and network interface cards of the physical data center 1304. Certain server computers host VMs and containers as described above. For example, server computer 1314 hosts two containers 1324, server computer 1326 hosts four VMs 1328, and server computer 1330 hosts a VM 1332. Other server computers may host applications as described above with reference to FIG. 4. For example, server computer 1318 hosts four applications 1334. The virtual-interface plane 1306 abstracts the resources of the physical data center 1304 to one or more VDCs comprising the virtual objects and one or more virtual data stores, such as virtual data stores 1338 and 1340. For example, one VDC may comprise VMs 1328 and virtual data store 1338.

In the following discussion, the term "object" is used to refer to a physical object or virtual object, such as a server computer, network device, application, VM, virtual network device, container, or any other physical or virtual object of a distributed computing system for which metric data can be collected to evaluate abnormal or normal behavior of the object. The term "resource" refers to a physical resource of a distributed computing system, such as, but are not limited to, a processor, a core, memory, a network connection, network interface, data-storage device, a mass-storage device, a switch, a router, and other any other component of the physical data center 1304. Resources of a server computer and clusters of server computers may form a resource pool for creating virtual resources of a virtual infrastructure used to run virtual objects. The term "resource" may also refer to a virtual resource, which may have been formed from physical resources assigned to a virtual object. For example, a resource may be a virtual processor used by a virtual object formed from one or more cores of a multicore processor, virtual memory formed from a portion of physical memory, virtual storage formed from a sector or image of a hard disk drive, a virtual switch, and a virtual router. Each virtual object uses only the physical resources assigned to the virtual object.

Processes and systems are implemented in a monitoring server that monitors physical and virtual resources by collecting numerous streams of time-dependent metric data associated with numerous physical and virtual resources. Each stream of metric data is time series data that may be generated by an operating system or by an object itself. A stream of metric data associated with a resource comprises a sequence of time-ordered metric values that are recorded in spaced points in time called "time stamps." A stream of metric data is simply called a "metric" and is denoted by $$v(t)=(x_i)_{i=1}^N=(x(t_i))_{i=1}^N \tag{1}$$

where
  N is the number of metric values in the sequence;
  $x_i=x(t_i)$ is a metric value;
  $t_i$ is a time stamp indicating when the metric value was recorded in a data-storage device; and
  subscript i is a time stamp index i=1, . . . , N.

Figure 14A:
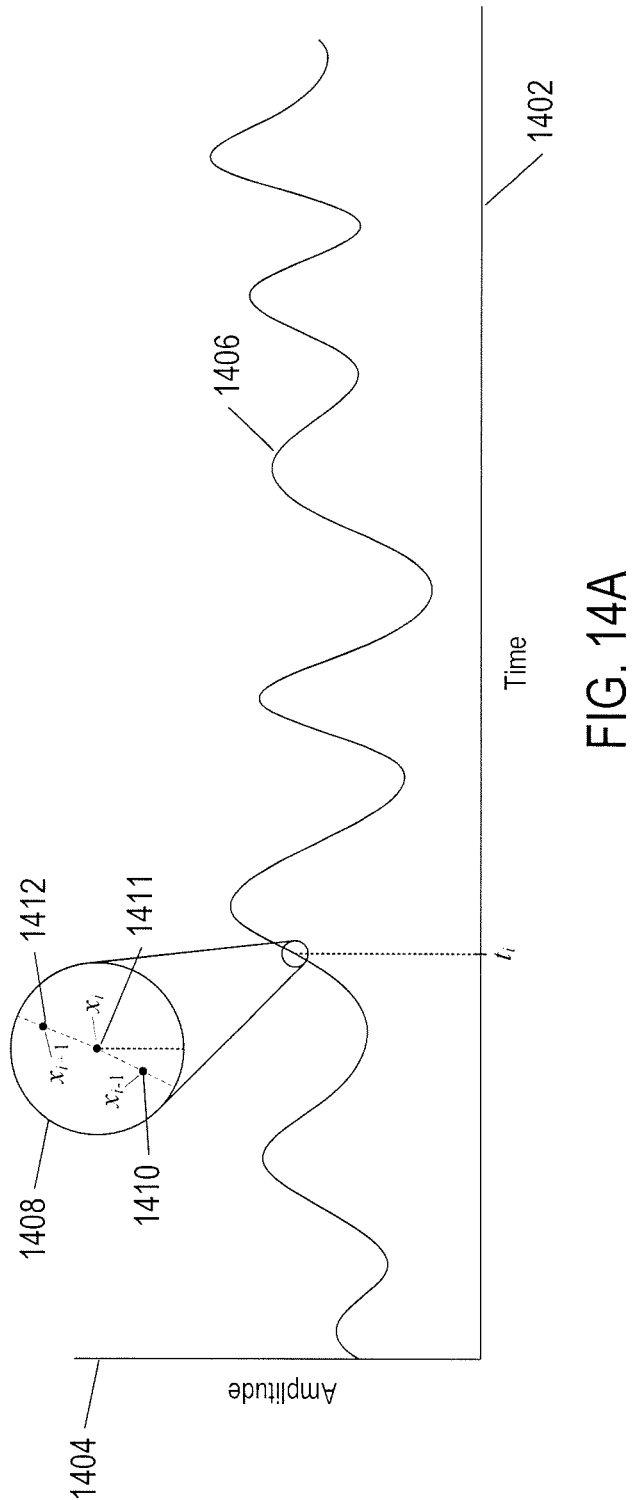
FIG. 14A shows a plot of an example metric represented as a sequence of time series data associated with a resource of a distributed computing system.

FIG. 14A shows a plot of an example metric associated with a physical or virtual resource. Horizontal axis 1402 represents time. Vertical axis 1404 represents a range of metric value amplitudes. Curve 1406 represents a metric as time series data. In practice, a metric comprises sequence of discrete metric values in which each metric value is recorded in a data-storage device. FIG. 14 includes a magnified view 1408 of three consecutive metric values represented by points. Each point represents an amplitude of the metric at a corresponding time stamp. For example, points 1410-1412 represent consecutive metric values (i.e., amplitudes) $x_{i-1}$, $x_i$, and $x_{i+1}$ recorded in a data-storage device at corresponding time steps $t_{i-1}$, $t_i$, and $t_{i+1}$. The example metric may represent usage of a physical or virtual resource. For example, the metric may represent CPU usage of a core in a multicore processor of a server computer over time. The metric may represent the amount of virtual memory a VM uses over time. The metric may represent network throughput for a server computer. Network throughput is the number of bits of data transmitted to and from a physical or virtual object and is recorded in megabits, kilobits, or bits per second. The metric may represent network traffic for a server computer. Network traffic at a physical or virtual object is a count of the number of data packets received and sent per unit of time.

Figure 14B:
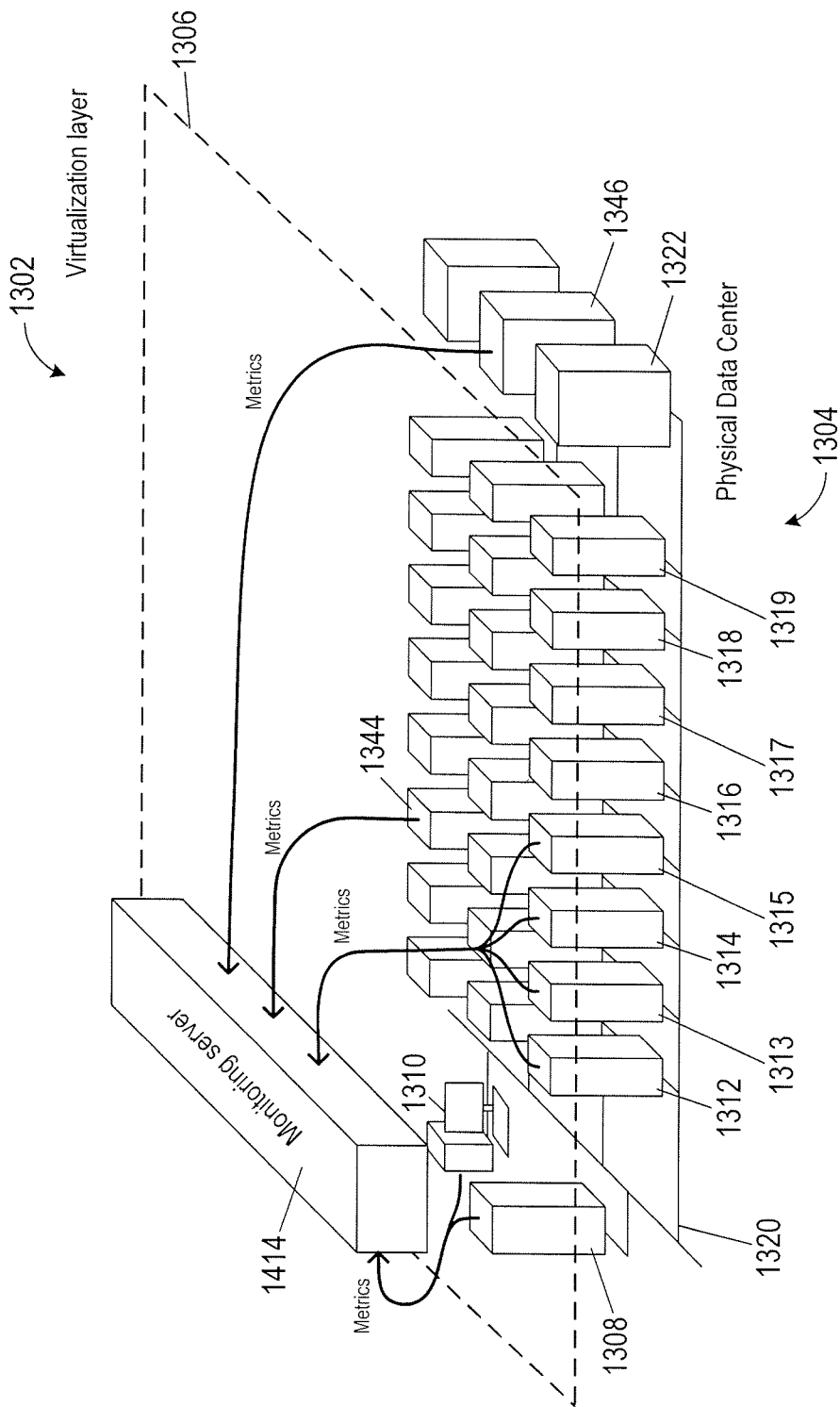
FIGS. 14B-14C show numerous metrics transmitted to a monitoring server.
Figure 14C:
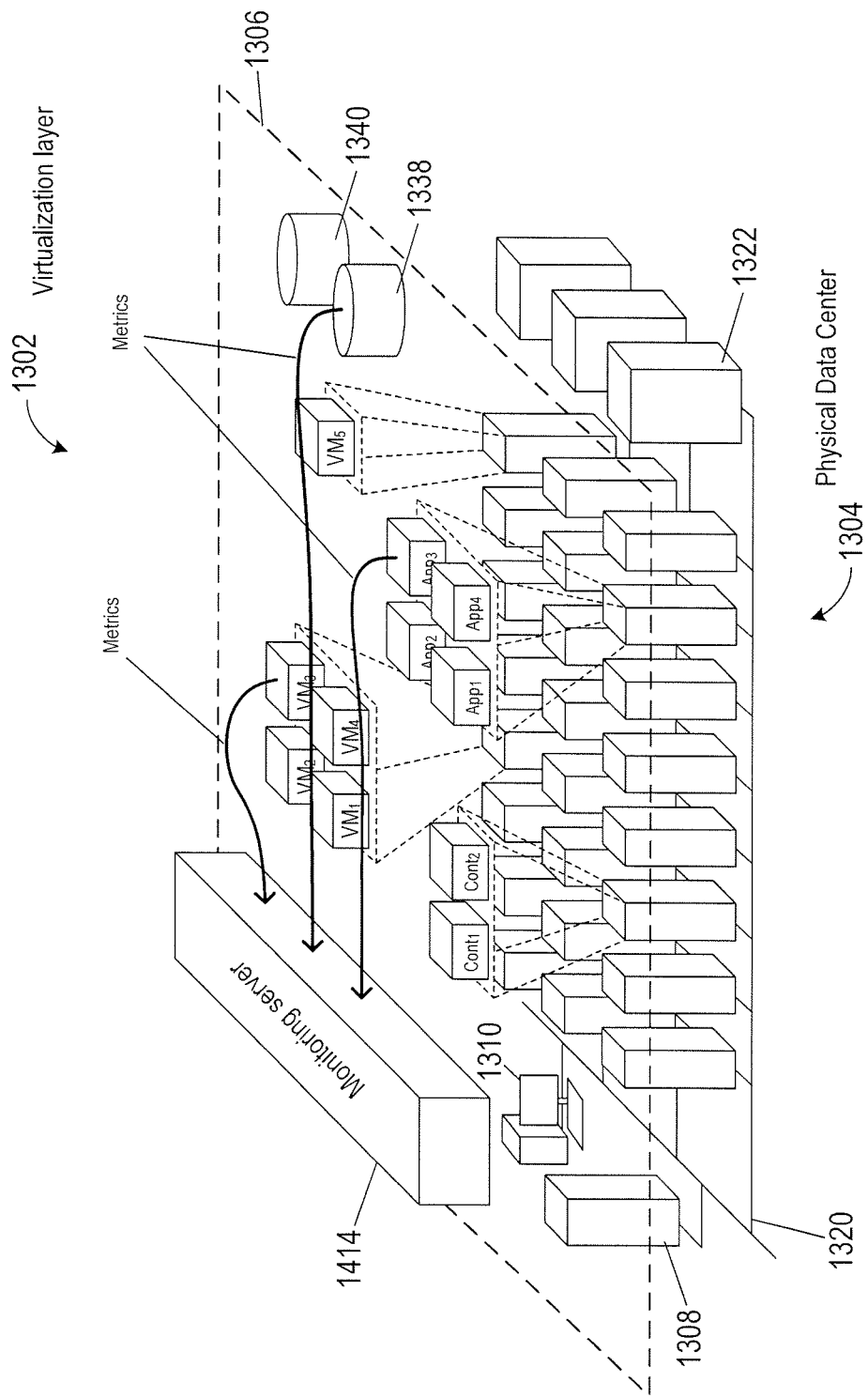

In FIGS. 14B-14C, a monitoring server 1414 collects numerous metrics associated with numerous physical and virtual resources. The monitoring server 1414 may be implemented in a VM to collect and processes the metrics, as described below, to identify abnormal behaving objects of the distributed computing system and may generate recommendations to correct abnormally behaving objects or execute remedial measures, such as reconfiguring a virtual network of a VDC or migrating VMs from one server computer to another. For example, remedial measures may include, but are not limited to, powering down server computers, replacing VMs disabled by physical hardware problems and failures, spinning up cloned VMs on additional server computers to ensure that the services provided by the VMs are accessible to increasing demand or when one of the VMs becomes compute or data-access bound. As shown in FIGS. 14B-14C, directional arrows represent metrics sent from physical and virtual resources to the monitoring server 1414. In FIG. 14B, PC 1310, server computers 1308 and 1312-1315, and mass-storage array 1322 sends a metric to the monitoring server 1414. Clusters of server computers may also send metrics to the monitoring server 1414. For example, a cluster of server computers 1312-1315 sends metrics to the monitoring server 1414. In FIG. 14C, the operating systems, VMs, containers, applications, and virtual storage may independently send metrics to the monitoring server 1414, depending on when the time series data of the metric are generated. For example, certain objects may send time series data of metric as the time series data is generated while other objects may only send time series data of metric at certain times or when requested to send by the monitor server 1414.

The millions of metrics collected and recorded by the monitoring server 1414 contain information that is used to determine, as described below, whether individual objects of the physical data center exhibit abnormal or normal behavior. Each object may have tens to hundreds of associated metrics. A server computer may have numerous metrics that represent usage of each core of a multicore core processor, memory usage, storage usage, network throughput, error rates, datastores, disk usage, average response times, peak response times, thread counts, and power usage, just to name a few. A virtual object, such as a VM, may have hundreds of associated metrics that monitor both physical and virtual resource usage, such as virtual CPU metrics, virtual memory usage metrics, virtual disk usage, virtual storage space, number of data stores, average and peak response times for various physical and virtual resources of the VM, network throughput, and power usage, just to name a few.

In order to determine whether an object is exhibiting abnormal or normal behavior, processes and systems identify the metrics associated with the object. A set of metrics associated with an object is denoted by:

$$\{v_j(t)\}_{j=1}^{J} = \{(x_i^{(j)})_{i=1}^{N}\}_{j=1}^{J} = \{(x^{(j)}(t_i))_{i=1}^{N}\}_{j=1}^{J} \quad (2)$$

where
j is a metric index for the object j=1, ..., J; and
J is the number of metrics associated with the object.

Processes and system prepare the set of metrics associated with an object by deleting constant and almost-constant metrics, which are not helpful in identifying abnormal behavior of the object. Constant or nearly constant metrics may be identified by computing the standard deviation of each metric. The standard deviation is a measure of the amount of variation or dispersion associated with a metric. A large standard deviation indicates large variability in the metric. A small standard deviation indicates low variability in the metric. The standard deviation is compared with a threshold to determine whether the metric has acceptable variation for identifying abnormal or normal behavior of the object.

The standard deviation of a metric is computed by:

$$\sigma_j = \sqrt{\frac{1}{N}\sum_{i=1}^{N}(x_i^{(j)} - \mu_j)^2} \quad (3a)$$

where the mean of the metric is given by $$\mu_j = \frac{1}{N}\sum_{i=1}^{N} x_i^{(j)} \quad (3b)$$

When the standard deviation $\sigma_j > \varepsilon_{st}$, where $\varepsilon_{st}$ is a standard deviation threshold (e.g., $\varepsilon_{st}=0.01$), the metric $v_j(t)$ is considered to have acceptable variation and is retained. Otherwise, when the standard deviation $\sigma_j \le \varepsilon_{st}$, the metric $v_j(t)$ is omitted from consideration of abnormal and normal behavior of the object. Let M be the number of metrics that have acceptable variation (i.e., $\sigma_j > \varepsilon_{st}$).

Figure 15A:
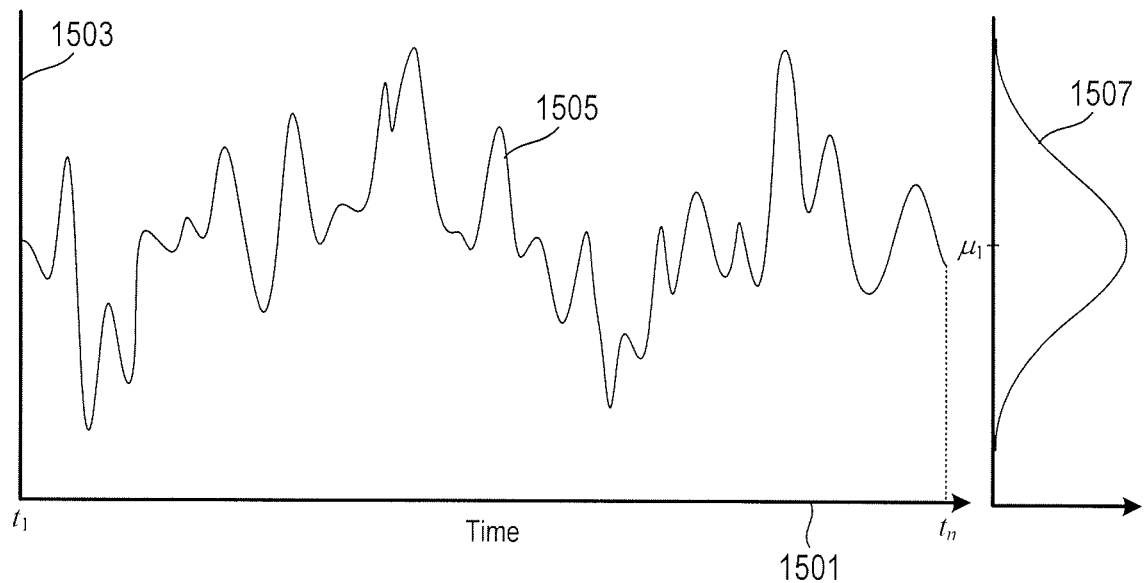
FIGS. 15A-15B shows plots of two different example metrics.
Figure 15B:
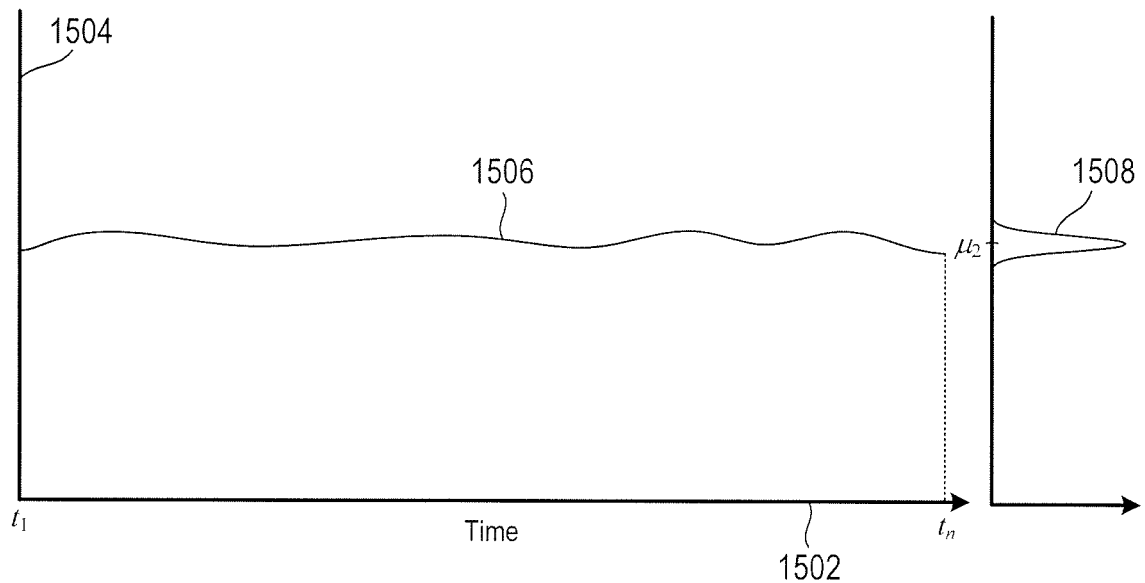

FIGS. 15A-15B show plots of two different example metrics. Horizontal axes 1501 and 1502 represent time. Vertical axis 1503 represents a range of metric values for a first metric $v_1(t)$. Vertical axis 1504 represents the same range of metric values for a second metric $v_2(t)$. Curve 1505 represents the metric $v_1(t)$ over a time interval between time stamps $t_1$ and $t_n$. Curve 1506 represents the metric $v_2(t)$ over the same time interval. FIG. 15A includes a plot an example first distribution 1507 of the first metric centered about a mean value $\mu_1$, and FIG. 15B includes a plot an example second distribution 1508 of the second metric centered about a mean value $\mu_2$. The distributions 1507 and 1508 reveal that the first metric 1505 has a much higher degree of variability than the second metric.

The resources associated with an object have different corresponding metrics in which the intervals between time stamps for certain metrics may not be uniform and the time stamps for many metrics may be different. For example, various different resources may generate metric data periodically at regular intervals, and the regular intervals may be similar or identical for the resources. Other resources may generate metric values nonperiodically and the times at which a given resource generates metric data may be synchronized with respect to the times at which another resource generate metric data. In certain cases, a data-collection computational entity, such as the monitoring server 1414, may request metric data from data sources at regular intervals while, while in other cases, the data sources may actively send metric data at periodic intervals or, alternatively, whenever metric data becomes available. As a result, the metrics associated with an object may not be synchronized.

Figure 16A:
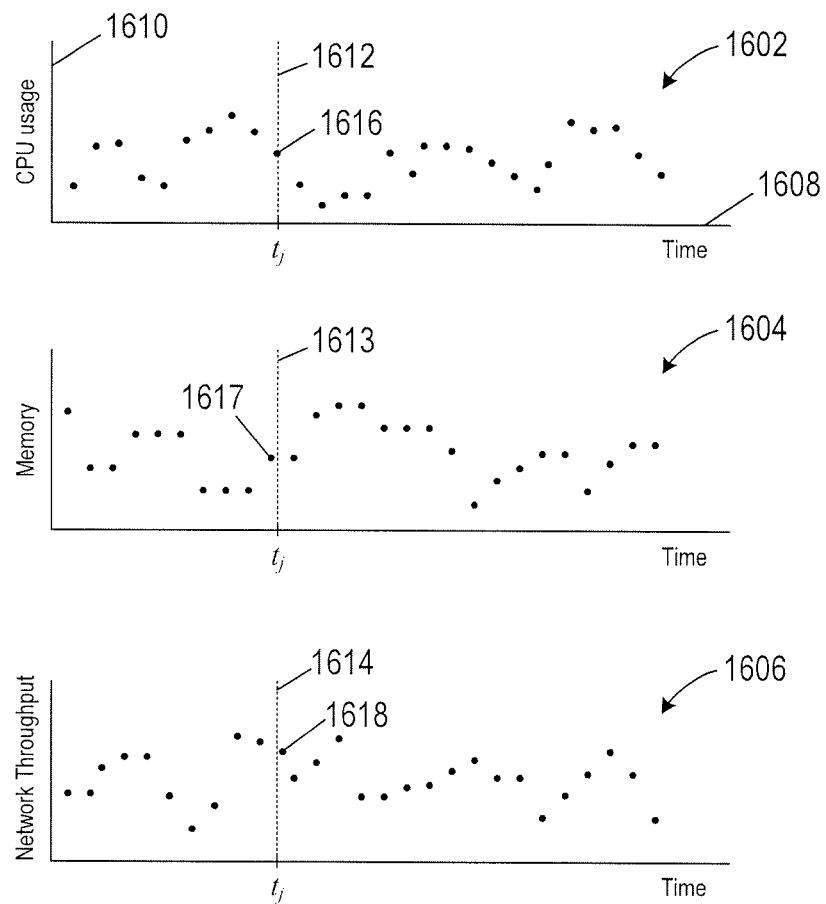
FIG. 16A shows example plots of three unsynchronized metrics for an object recorded in the same time interval.

FIG. 16A shows example plots of three unsynchronized metrics for CPU usage 1602, memory 1603, and network throughput 1606 for an object recorded in the same time interval. Horizontal axes, such as horizontal axis 1608, represent the length of the time interval. Vertical axes, such as vertical axis 1610, represent ranges of metric values for the CPU, memory, and network throughput. Dots represent metric values recorded at different time stamps in the time interval. Dashed lines 1612-1614 mark the same time $t_j$ in the time interval. A metric value 1616 represents CPU usage for the object recorded at time step $t_j$. However, metric values 1617 and 1618 representing memory and network throughput are not recorded at the same time step $t_j$.

For the types of processing carried out by the currently disclosed processes and systems, it is convenient to ensure that the metric values for all metrics used to evaluate normal and abnormal behavior of an object are logically emitted in a periodic manner and that the transmission of metric data is synchronized among the metrics to a general set of uniformly spaced time stamps. The metrics may be synchronized to the general set of uniformly spaced time stamps.

Metric values may be synchronized by computing a running-time average of metric values in a sliding time window centered at a time step of the general set of uniformly spaced time stamps. In an alternative implementation, the metric values with time stamps in the sliding time window may be smoothed by computing a running time median of metric values in the sliding time window centered at a time stamp of the general set of uniformly spaced time steps. Processes and systems may also synchronize the metrics by deleting time stamps of missing metric values or interpolating missing metric data at time stamps of the general set of uniformly spaced time stamps using linear, quadratic, or spline interpolation.

Figure 16B:
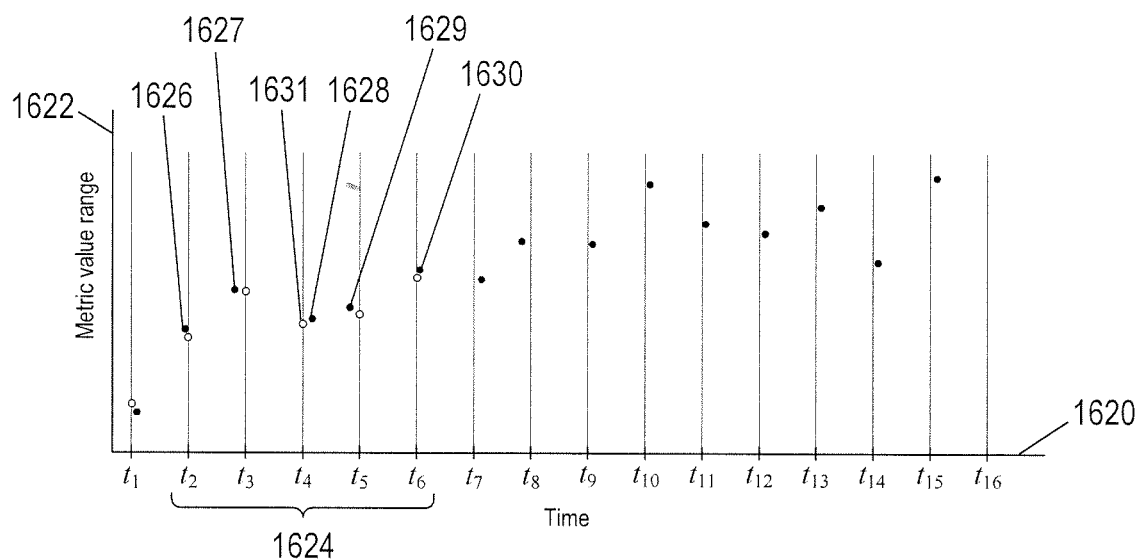
FIG. 16B shows a plot of metric values of a metric synchronized to time steps of a general set of uniformly spaced time steps.

FIG. 16B shows a plot of metric values of a metric synchronized to time steps of a general set of uniformly spaced time steps. Horizontal axis 1620 represents time. Vertical axis 1622 represents a range of metric values. Solid dots represent metric values recorded at time stamps. Marks located along time axis 1620 represent time stamps of a general set of uniformly spaced time stamps. Note that the metric values are not aligned with the time stamps of the general set of uniformly spaced time stamps. Open dots represent metric values aligned with the time steps of the general set of uniformly spaced time stamps. Bracket 1624 represents a sliding time window centered at a time stamp $t_4$ or the general set. The metric values 1626-1630 located with the sliding time window 1624 are averaged to obtain synchronized metric value 1631 at the time stamp $t_4$.

Certain metrics associated with an object may also be correlated. Correlated sequences are not independent and may contain redundant information. Processes and systems further reduce the number of metrics by eliminating correlated metrics form the set of metrics associated with the object. Processes and systems begin by computing a correlation matrix from pairs of the time synchronized sequences of metric data.

FIG. 17 shows an example an M×M correlation matrix of M metrics. Each element of the correlation matrix is computed as follows:

$$corr(v_j, v_k) = \frac{\sum_{i=1}^{N} (x_i^{(j)} - \mu_j)(x_i^{(k)} - \mu_k)}{\sigma_j \sigma_k} \quad (6)$$

where j, k=1, . . . , M.

The correlation matrix is a square symmetric matrix. The eigenvalues of the correlation matrix are computed. A numerical rank of the correlation matrix is determined from the eigenvalues based on tolerance $0 \leq \tau \leq 1$. For example, the tolerance $\tau$ may be in an interval $0.8 \leq \tau \leq 1$. Consider a set of eigenvalues, $\{\lambda_k\}_{k=1}^{M}$, of the correlation matrix. The eigenvalues of the correlation matrix are positive values. The eigenvalues are rank ordered from largest to smallest (i.e., $\lambda_k \geq \lambda_{k+1}$ for k=1, . . . , M with $\lambda_1$ the largest eigenvalue and $\lambda_M$ the smallest eigenvalue). The accumulated impact of the eigenvalues is determined based on the tolerance $\tau$ according to the following conditions:

$$\frac{\lambda_1 + \cdots + \lambda_{m-1}}{M} < \tau \quad (7a)$$

$$\frac{\lambda_1 + \cdots + \lambda_{m-1} + \lambda_m}{M} \geq \tau \quad (7b)$$

where m is the numerical rank of the correlation matrix.

The numerical rank m indicates that the metrics $\{v_j(t)\}_{j=1}^{M}$ independent metrics.

Given the numerical rank m, the m independent metrics may be determined using QR decomposition of the correlation matrix. In particular, the m independent metrics (i.e., uncorrelated metrics) are determined based on the m largest diagonal elements of an R matrix obtained from QR decomposition of the correlation matrix.

FIG. 18 shows QR decomposition of the correlation matrix shown in FIG. 17. The M columns of the correlation matrix are denoted by $C_1, C_2, \ldots, C_M$, M columns of the Q matrix are denoted by $Q_1, Q_2, \ldots, Q_M$, and M diagonal elements of the R matrix are denoted by $r_{11}, r_{22}, \ldots, r_{MM}$. The columns of the Q matrix are determined based on the columns of the correlation matrix as follows:

$$Q_i = \frac{U_i}{\|U_i\|} \quad (8a)$$

where $\|U_i\|$ denotes the length of a vector $U_i$; and the vectors $U_i$ are calculated according to $$U_1 = C_1 \quad (8b)$$

$$U_i = C_i - \sum_{j=1}^{i-1} \frac{\langle Q_j, C_i \rangle}{\langle Q_j, Q_j \rangle} Q_j \quad (8c)$$

where $\langle \cdot, \cdot \rangle$ denotes the scalar product.

The diagonal matrix elements of the R matrix are given by $$r_{ii} = \langle Q_i, C_i \rangle \quad (8d)$$

The metrics that correspond to the largest in (i.e., numerical rank) diagonal elements of the R matrix are uncorrelated, synchronized, and have acceptable variation over time. Let $$\{v_k(t)\}_{k=1}^{m} = \{(x_i^{(k)})_{i=1}^{N}\}_{k=1}^{m} = \{(x^{(k)}(t_i))_{i=1}^{N}\}_{k=1}^{m} \quad (9)$$

where k is the index for metrics that are uncorrelated, synchronized, and have acceptable variation over time.

Processes and system normalize each of the m metrics and compute a sequence of object indicators from the m normalized metrics. First, a normalized metric is denoted given by $$\overline{v}_k(t) = (\overline{x}_i^{(k)})_{i=1}^{N} \quad (10)$$

The normalized metric values of the normalized metric are computed by $$\overline{x}_i^{(k)} = \frac{x_i^{(k)} - x_{min}^{(k)}}{x_{max}^{(k)} - x_{min}^{(k)}}$$

where $x_{max}^{(k)}$ is the maximum metric value and $x_{min}^{(k)}$ is the minimum metric value in the k-th metric $$\left(x_i^{(k)}\right)_{i=1}^N.$$

The sequence of object indicators is a combined representation of the m normalized metrics and is called an "indicator metric." One of the following object indicator functions below may be used to compute the indicator metric values of an indicator metric from the m normalized metrics:

(1) An average of available time series as an object indicator is given by $$v_{ave}(t) = (x_i^{(ave)})_{i=1}^N \tag{11a}$$

where $$x_i^{(ave)} = \frac{1}{m}\sum_{k=1}^m \bar{x}_i^{(k)}.$$

(2) An average of absolute available time series as an object indicator is given by $$v_{ave\_abs}(t) = \left(x_i^{(ave\_abs)}\right)_{i=1}^N \tag{11b}$$

where $$x_i^{(ave\_abs)} = \frac{1}{m}\sum_{k=1}^m |\bar{x}_i^{(k)}|; \text{ and}$$

$|\cdot|$ is the absolute value operator.

(3) Euclidean distance as an object indicator is given by $$v_E(t) = (x_i^{(E)})_{i=1}^N \tag{11c}$$

where $$x_i^{(E)} = \sqrt{(\bar{x}_i^{(1)})^2 + \cdots + (\bar{x}_i^{(m)})^2}.$$

(4) Maximum-distance as an object indicator is given by $$v_E(t) = (x_i^{(max)})_{i=1}^N \tag{11d}$$

where $$x_i^{(max)} = \max\{|\bar{x}_i^{(1)}|, \ldots, |\bar{x}_i^{(m)}|\}.$$

Processes and systems identify outlier indicator values in the indicator metric by first fitting a loess function to the indicator metric and subtracting the loess function from the indicator metric. If the indicator metric is non-trendy and non-seasonal data, the loess function may be a locally weighted scatterplot smoothing function fit to the indicator metric. In one implementation, the locally weighted scattered smoothing function may be a moving average in a sliding time window given by $$p(t_i) = \frac{1}{2L+1}\sum_{l=-L}^{L} x_{i+l}^{(ind)} \tag{12}$$

where
L is an integer;
$x_{i+1}^{(ind)}$ is the object indicator value at time stamp $t_{i+1}$;
$p(t_i)$ is the moving average at time step $t_i$; and
the sliding time window is $[t_{i-L}, \ldots, t_i, \ldots, t_{i-L}]$.
In another implementation, the loess function is given by $$p(t_i) = \sum_{j=0}^{p} \beta_j t_i^j + \varepsilon \tag{13}$$

where
$\beta_j$'s are the coefficients; and
$\varepsilon$ is a randomly selecting value from a fixed normal distribution with mean zero and non-zero variance.
If the indicator metric is also seasonal, a seasonal component may be determined by harmonic analysis, such as Fourier analysis, applied to the metric. The seasonal component may be added to the loess function as follows:

$$p(t_i) = \sum_{j=0}^{p} \beta_j t_i^j + \varepsilon + s(t_i) \tag{14}$$

where $s(t_i)$ is the seasonal component at time stamp $t_i$.
Residuals are computed between the object indicator values of the sequences of object indicators and corresponding points along the loess function by:

$$r_i = x_i^{(ind)} - p(t_i) \tag{15}$$

for $i=1, \ldots, N$.

Figure 19A:
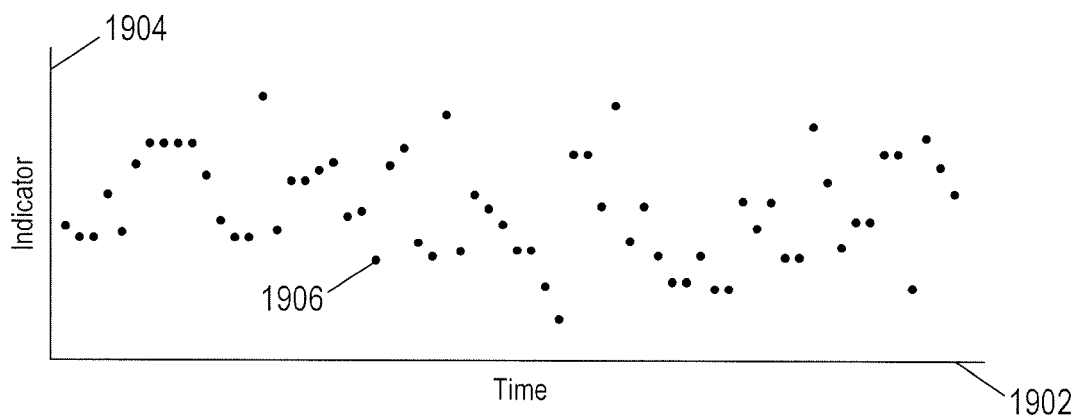
FIGS. 19A-19C show an example of determining a sequence of residuals for an example indicator metric.
Figure 19B:
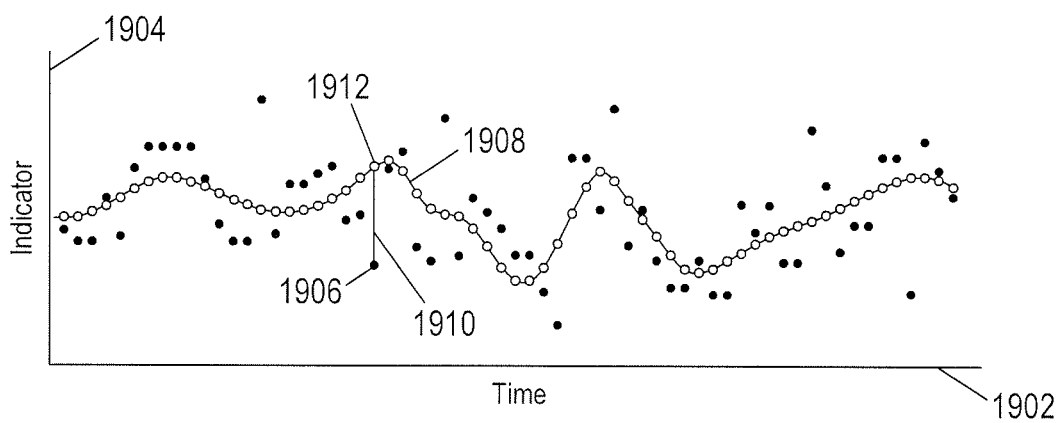
Figure 19C:
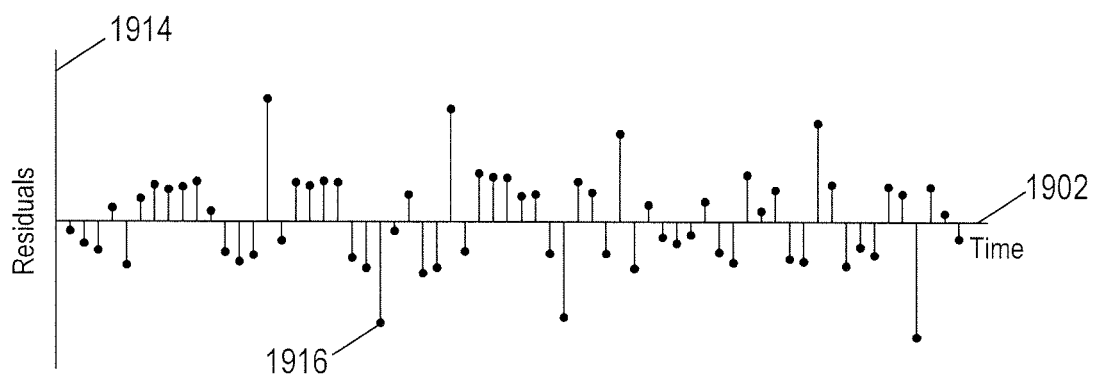

FIGS. 19A-19C show an example of determining a sequence of residuals for an example indicator metric. FIG. 19A shows a plot of the example indicator metric. Horizontal axis 1902 represents time. Vertical axis 1904 represents a range of indicator values. Dots, such as dot 1906, represent object indicator values computed from m normalized sequences of metric data according to one of the four object indicators represented by Equations (11a)-(11d). FIG. 19B shows a curve 1908 that represents an example loess function computed from the indicator metric, as described above with reference to Equations (12) and (13). Open dots along curve 1908 represents loess function values at the time stamps of the indicator metric. Vertical line 1910 between object indicator value 1906 and loess function value 1912 represents a residual according to Equation (15). FIG. 19C shows a plot of residuals between the indicator metric and the loess curve shown in FIG. 19A. Vertical axis 1914 represents a range of indicator values. Dots represent residuals between the loess curve values and object indicator values. For example, dot 1916 represents the value of the residual 1910 between the object indicator value 1906 and loess curve value 1912.

Outlier residuals of a sequence of residuals are residuals that lie outside a quantile range of $\pm\alpha(q_{1-\alpha}-q_\alpha)$, where $q_\alpha$ is the $\alpha$-th quantile of the residuals and $0<\alpha<1$. For example, if the residuals are normally distributed, outlier residuals lie outside boxplots with a range of $\pm 1.5(q_{0.75}-q_{0.25})$ and extreme outlier residuals lie outside the range $\pm 3(q_{0.75}-q_{0.25})$, where $q_{0.25}$ and $q_{0.75}$ are quartiles and the difference $(q_{0.75}-q_{0.25})$ is the inner quartile range. The time stamps of the outlier residuals are identified as outlier time stamps in which one or more of the metrics used to form the indicator metric record abnormal behavior exhibited by the object. The object indicators that correspond to the outlier time stamps are outlier indicators.

Figure 19D:
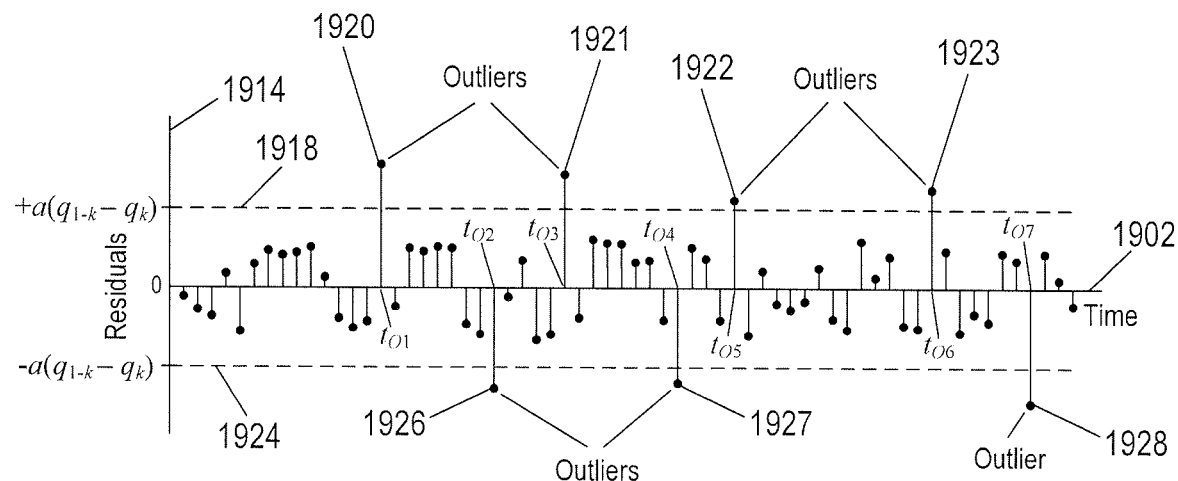
FIG. 19D shows a plot of residuals and quantiles that serve as upper and lower residual thresholds for outlier residuals.
Figure 19E:
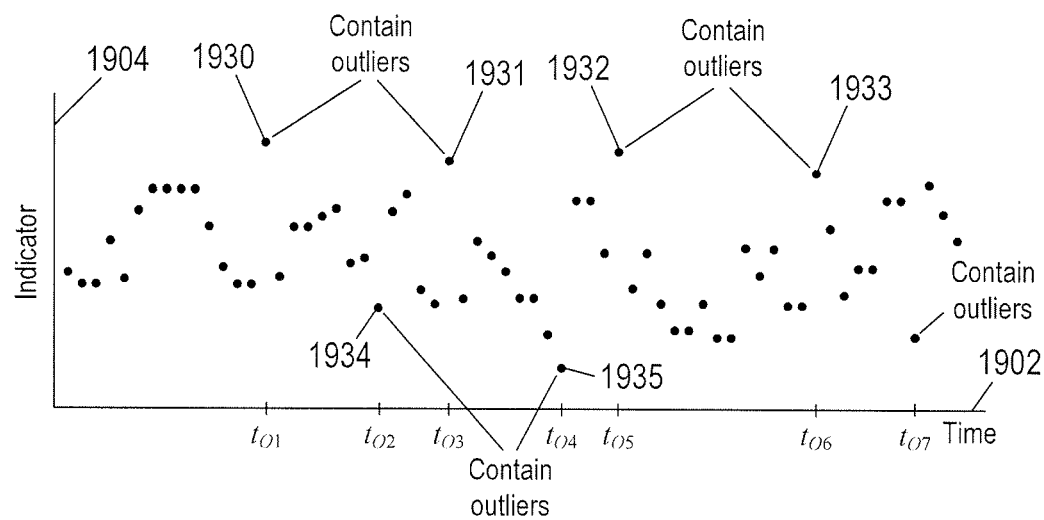
FIG. 19E shows a plot of an indicator metric with outlier indicators that correspond to outlier time stamps.

FIG. 19D shows a plot of residuals and quantiles that serve as upper and lower residual thresholds. The upper limit 1918 of the quantile $\alpha(q_{1-\alpha}-q_\alpha)$ is an upper threshold. Residuals 1920-1923 are greater than the upper limit 1918 and are identified as outlier residuals. The lower limit 1924 of the quantile $-\alpha(q_{1-\alpha}-q_\alpha)$ is a lower threshold. Residuals 1926-1928 are less than the lower limit 1924 and are also identified as outlier residuals. Outlier time stamps that correspond to the outlier residuals are denoted by $t_{o1}$, $t_{o2}$, $t_{o3}$, $t_{o4}$, $t_{o5}$, $t_{o6}$, and $t_{o7}$. FIG. 19E shows a plot of the indicator metric, shown in FIG. 19A, with outlier indicators 1930-1935 that correspond to the outlier time stamps. One or more of the metrics at the outlier time stamps records is assumed to record abnormal behavior by the object. For example, suppose the indicator metric in FIG. 19E was created using the maximum distance given by Equation (11d). The outlier indicator 1930 is the maximum value of the absolute values $|\bar{x}^{(1)(t_{o4})}|$, $|\bar{x}^{(2)(t_{o4})}|$, and, . . . , $|\bar{x}^{(m)(t_{o4})}|$, which is an outlier for the corresponding metric.

Figure 20:
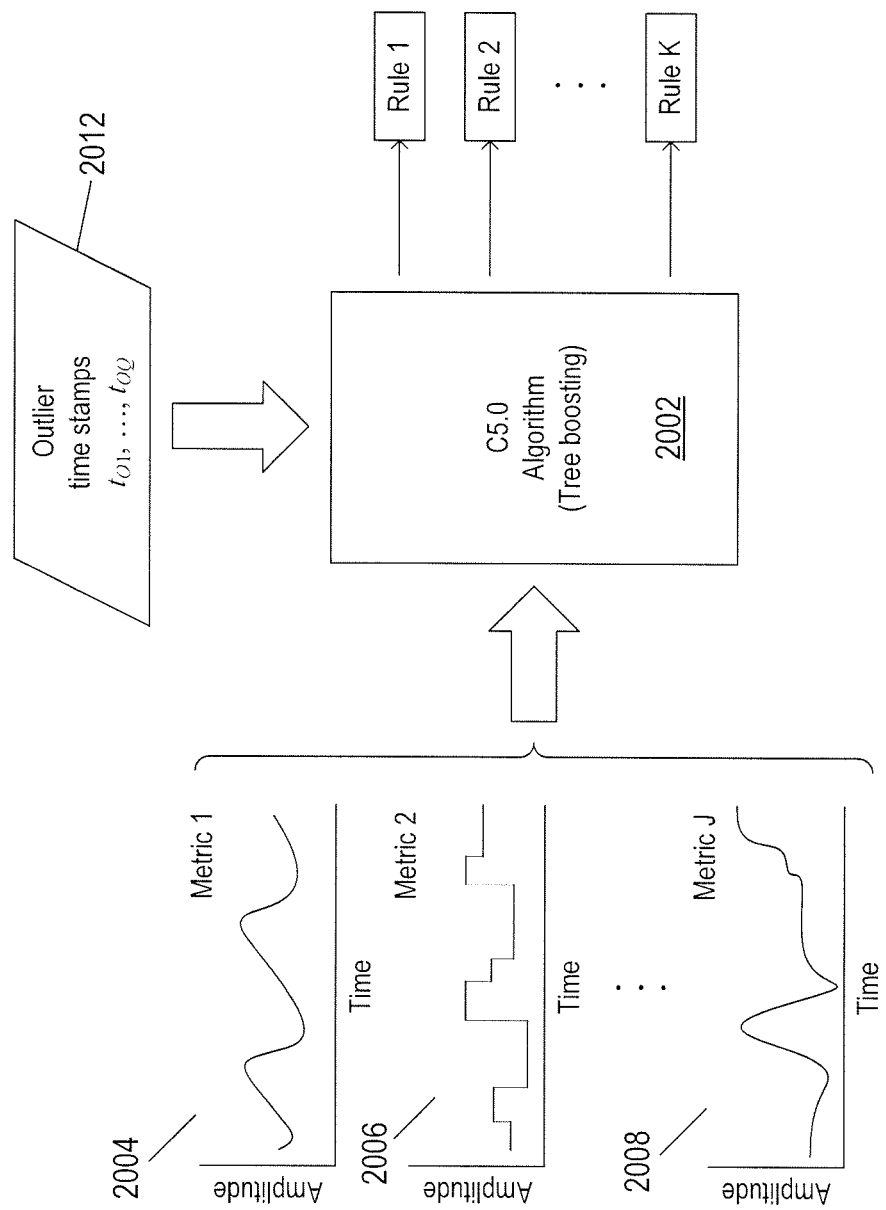
FIG. 20 shows an example of generating rules from metrics associated with an object and outlier time stamps.

Processes and systems compute rules for evaluating the metrics of the object using a tree boosting C5.0 Algorithm. The outlier time stamps and the in metrics are input to the C5.0 Algorithm, which uses machine learning to generate rules that are used to identify abnormal behavior of the object. FIG. 20 shows an example of C5.0 Algorithm used to generate rules for each of the metrics associated with the object. Block 2002 represents the computation operations carried out by C5.0 Algorithm. Example plots 2004, 2006, and 2008 represent J metrics associated with the object. For example, plot 2004 represents a metric 1, plot 2006 represents a metric 2, and plot 2008 represents a metric J. Ellipsis 2010 represents the remaining metrics associated with the object. As shown in FIG. 20, the J metrics associated with the object and the outlier time stamps 2012 are input to the C5.0 Algorithm to generate K rules, where K<J. Each rule provides a classification of an abnormal state of the object. A rule may be associated with a single metric, or a rule may be associated with numerous metrics. Violation of a rule may be an indication of a particular abnormal state of the object. Depending on the type of rule violation, processes and systems may generate an alert identifying an abnormal state of the object. The rules obtained by the C5.0 Algorithm in FIG. 20 may be used to identify outliers in run-time metric values added to corresponding metrics.

Figure 21A:
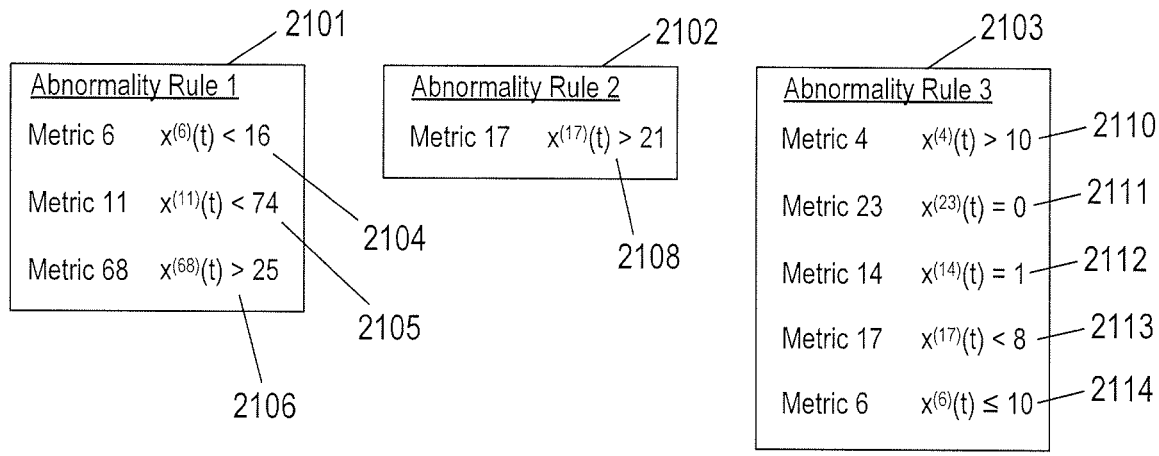
FIGS. 21A-21B show example rules used to identify abnormal object behavior.

FIG. 21A shows three examples of rules obtained from the process described with reference to FIG. 20. The three example rules are identified as Rule 1 2101, Rule 2 2102, and Rule 3 2103. Rule 1 comprises three conditions 2104-2106 regarding run-time metric values for metrics 6, metric 11, and metric 68. When the three conditions 2104-2106 are satisfied for three run-time metric values of corresponding metrics 6, metric 11, and metric 68 at about the same time stamp, Rule 1 has been violated and an alert is generated indicating the object is behaving abnormally due to a Rule 1 violation. Rule 2 comprises a single condition 2108 regarding run-time metric values for metric 17. When the condition 2108 is satisfied for a run-time metric value of corresponding metric 17, Rule 2 has been violated and an alert is generated indicating the object is behaving abnormally due to a Rule 2 violation. Rule 3 comprises five conditions 2110-2114 regarding run-time metric values for metrics 4, 6, 14, 17, and 23. When the four conditions 2111-2114 are satisfied for four run-time metric values of the corresponding metrics 4, 6, 14, 17, and 23 at about the same time stamp, Rule 3 has been violated and an alert is generated indicating the object is behaving abnormally due to a Rule 3 violation.

Figure 21B:
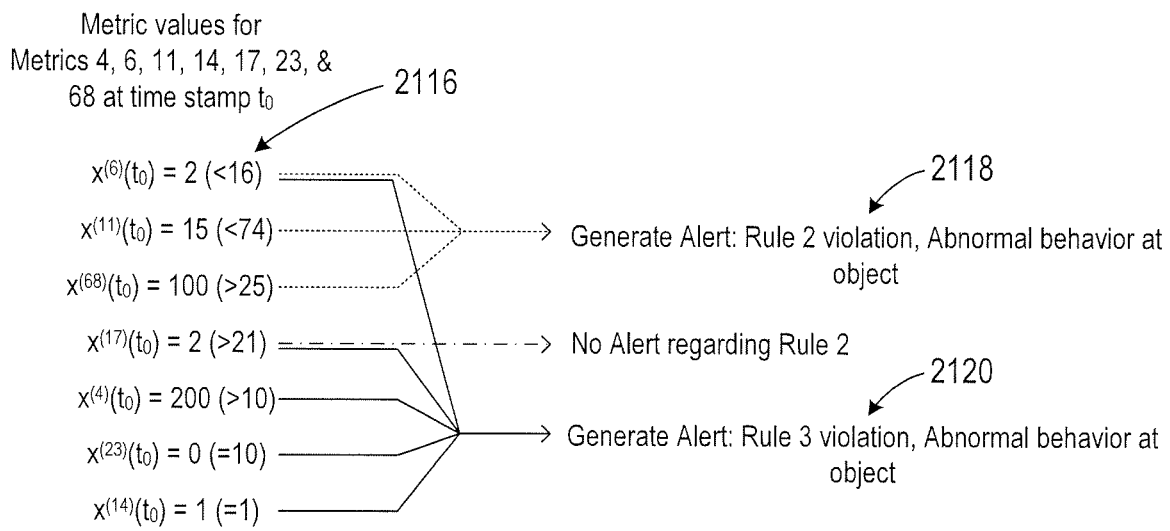

FIG. 21B shows an example of the rules Rule 1, 2, and 3 applied to run-time metric data generated by metrics 4, 6, 11, 14, 17, 23, and 64. FIG. 21A shows examples of run-time metric values 2116 of each of the metrics 4, 6, 11, 14, 17, 23, and 64 generated at the same time stamp $t_0$. For example, $x^{(6)}(t_0)=2$ is the metric value for the metric 6 generated at the tune stamp $t_0$. The conditions for the rules are displayed next to each of the run-time metric values. According to Rule 1 in FIG. 21A, the metric values $x^{(6)}(t_0)=2$, $x^{(11)}(t_0)=15$, and $x^{(68)}(t_0)=100$ satisfy the three conditions for a Rule 1 violation, which triggers an alert 2118. The example of FIG. 21B reveals that the run-time metric value of metric 17 does not violate Rule 2, which does not trigger an alert. The run-time metric values for metrics 4, 6, 14, 17, and 23 violate the Rule 3, which triggers an alert 2120. The alerts may be generated on an administration console to notify IT administrators of the abnormal behavior of the object.

Given the many different types of abnormal object states, IT administrators may have developed different remedial measures for correcting the various different abnormal object states. Processes and systems identify a rule violation that triggers an alert identifying the abnormal object state and may also generate instructions for correcting the abnormality or execute preprogrammed computer instructions that correct the abnormality. For example, if an object is a virtual object and an alert is generated indicating inadequate virtual processor capacity, remedial measures that increase the virtual processor capacity of the virtual object may be executed or the virtual object may be migrated to a different server computer with more available processing capacity.

Figure 22:
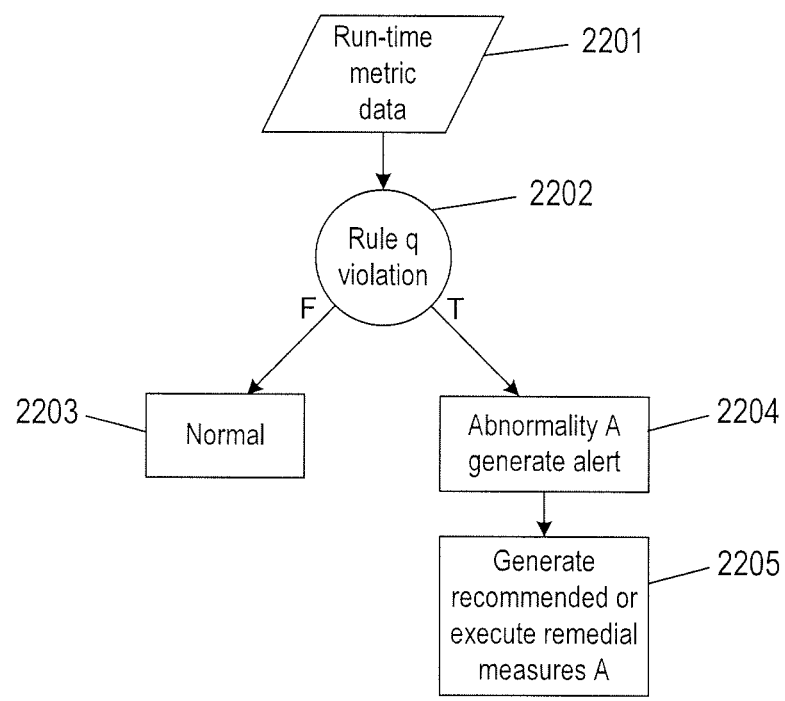
FIG. 22 shows an example graph of operations that may be executed in response to a single rule violation.

FIG. 22 shows an example graph that represents operations executed in response to a single rule violation. Nodes represent a run-time metric value, Rule q, and operations that are executed if Rule q is violated. Directional arrows represent directed edges that represent the relationships between nodes. Truth values are represented by T and F and are used to represent whether the rule has been violated, as described above with reference to FIGS. 21A-21B. Node 2201 represents run-time or newly identified metric value. Node 2202 represents violation of Rule q. Node 2203 represents normal operation of the resource. If the Rule q is violated, node 2204 represents generating an alert that identifies the type of rule violation, denoted by Abnormality A. For example, Abnormality A may represent an excessive error rate. Node 2205 represents generating recommended remedial measure A that correct Abnormality A or automatically execute remedial measure A.

In other instances, certain abnormal behaviors may be identified by a combination of two or more rule violations. Each combination of rule violations may have associated remedial measures for correcting the problem. For example, a computer server that has become compute bound may be identified when rules associated with CPU response time and memory usage are violated. A single alert may be generated indicating the server computer has become compute bound. Remedial measures may include restarting the server computer or migrating virtual objects to other server computers in order to reduce the workload at the server computer.

Figure 23:
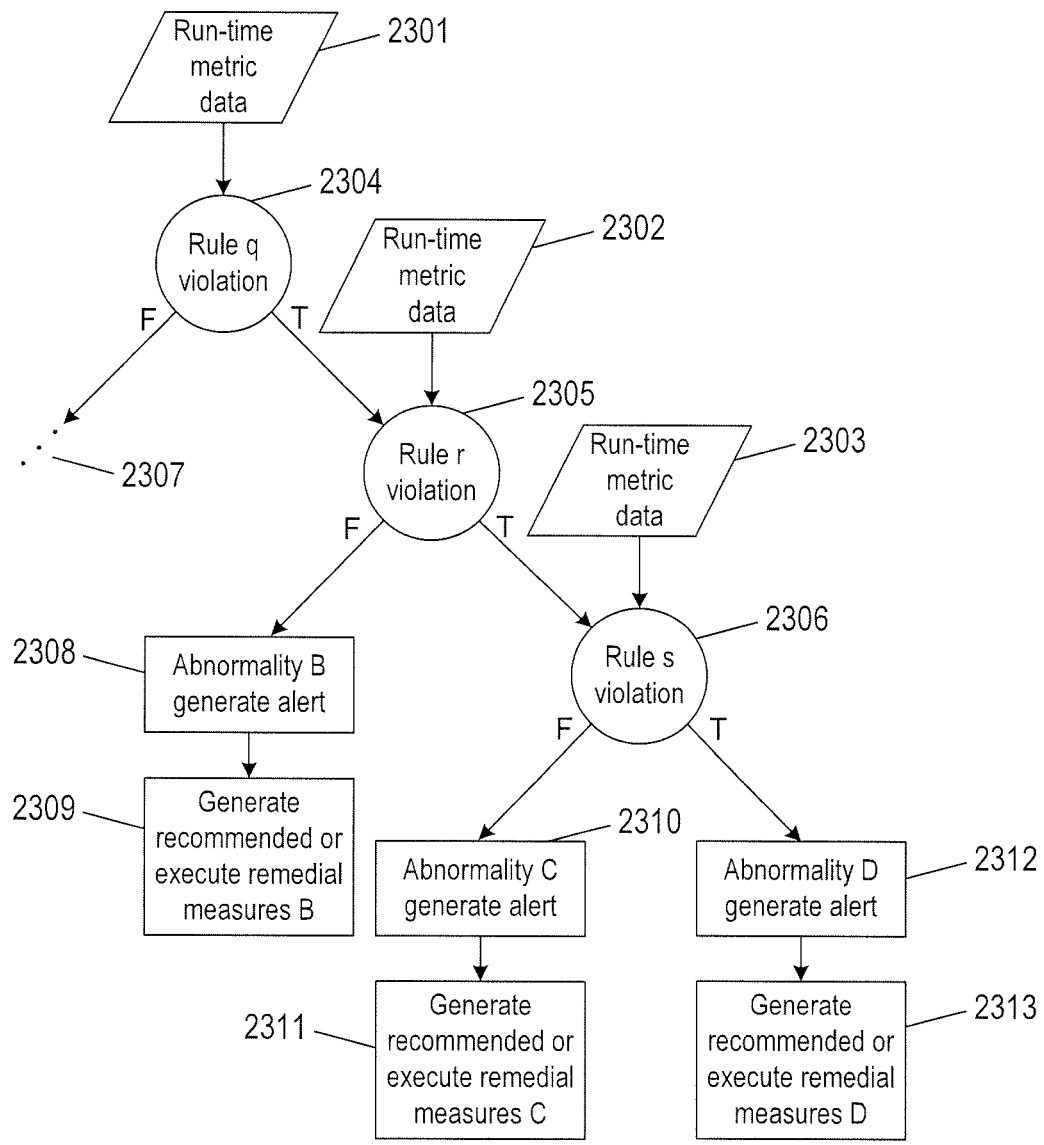
FIG. 23 shows an example graph of operations that may be executed in response to different combinations of rule violations.

FIG. 23 shows an example graph that represents operations that may be executed in response to different combinations of rule violations. Nodes 2301-2303 represents run-time metrics values for the metrics. Nodes 2304-2306 represent rules denoted by Rule q, Rule r, and Rule s. Ellipsis 2307 represents other nodes of the graph not shown. Nodes 2308, 2310, and 2312 represent three different types of alerts associated with three different types of abnormalities identified as Abnormality B, Abnormality C, and Abnormality D. For example, Abnormality B may represent excessive virtual CPU usage, Abnormality C may represent a combination of excessive virtual CPU and virtual memory usage, and Abnormality D may represent a combination of excessive virtual CPU usage, virtual memory usage, and virtual data storage usage. Nodes 2309, 2311, and 2313 represent three different types of remedial measures identified as remedial measure B, remedial measure C, and remedial measure D. For example, remedial measure B may represent increasing virtual CPU, remedial measure C may represent increasing virtual CPU and virtual memory, and remedial measure D may represent migrating the virtual object to a different server computer. As shown in FIG. 23, if the Rule q is violated and the Rule r is not violated, node 2308 generates an alert identifying abnormality B. Node 2309 generates recommended remedial measure B or automatically executes remedial measure B. If the Rules q and r are violated and the Rule s is not violated, node 2310 generates an alert identifying Abnormality C. Node 2311 generates recommended remedial measure C or automatically executes remedial measure C. If the Rules q, r, and s are violated, node 2312 generates an alert identifying Abnormality D. Node 2313 generates recommended remedial measure D or automatically executes the remedial measures D.

The methods described below with reference to FIGS. 24-27 are stored in one or more data-storage devices as machine-readable instructions that when executed by one or more processors of the computer system shown in FIG. 1 detect abnormally behaving objects of distributed computing system.

Figure 24:
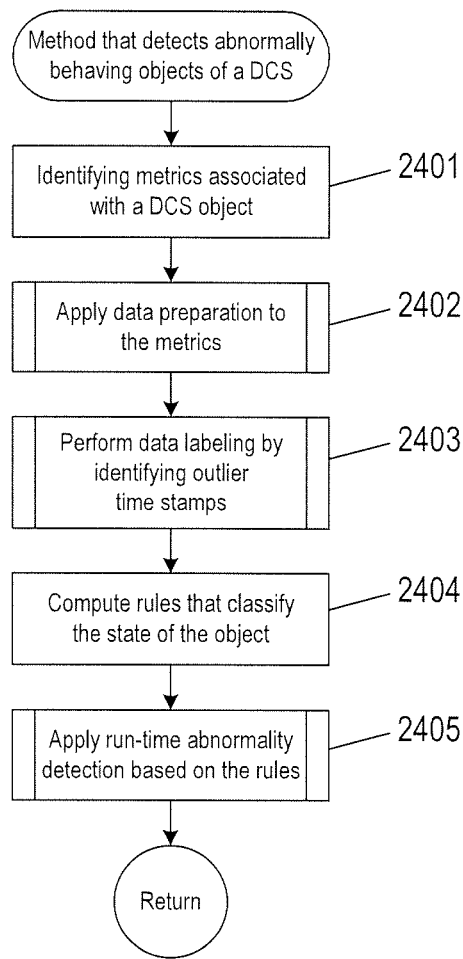
FIG. 24 shows a control-flow diagram of a method that detects abnormally behaving objects of a distributed computing system.

FIG. 24 shows a control-flow diagram of a method that detects abnormally behaving objects of a distributed computing system. In block 2401, metrics associated with an object of a distributed computing system are identified. In block 2402, a routine "apply data preparation to the metrics" is called to remove constant and nearly constant metrics, synchronize the metrics, and remove correlated metrics from consideration. In block 2403, a routine "perform data labelling by identifying outlier time stamps" is called to identify the time steps when abnormalities occur. In block 2404, rules that classify the state of the object are generated based on the collected metrics and the outlier time stamps, as described above with reference to FIG. 20. In block 2405, a routine "apply run-time abnormality detection based on the rules" is called to detect anomalous behavior of the object using the rules.

Figure 25:
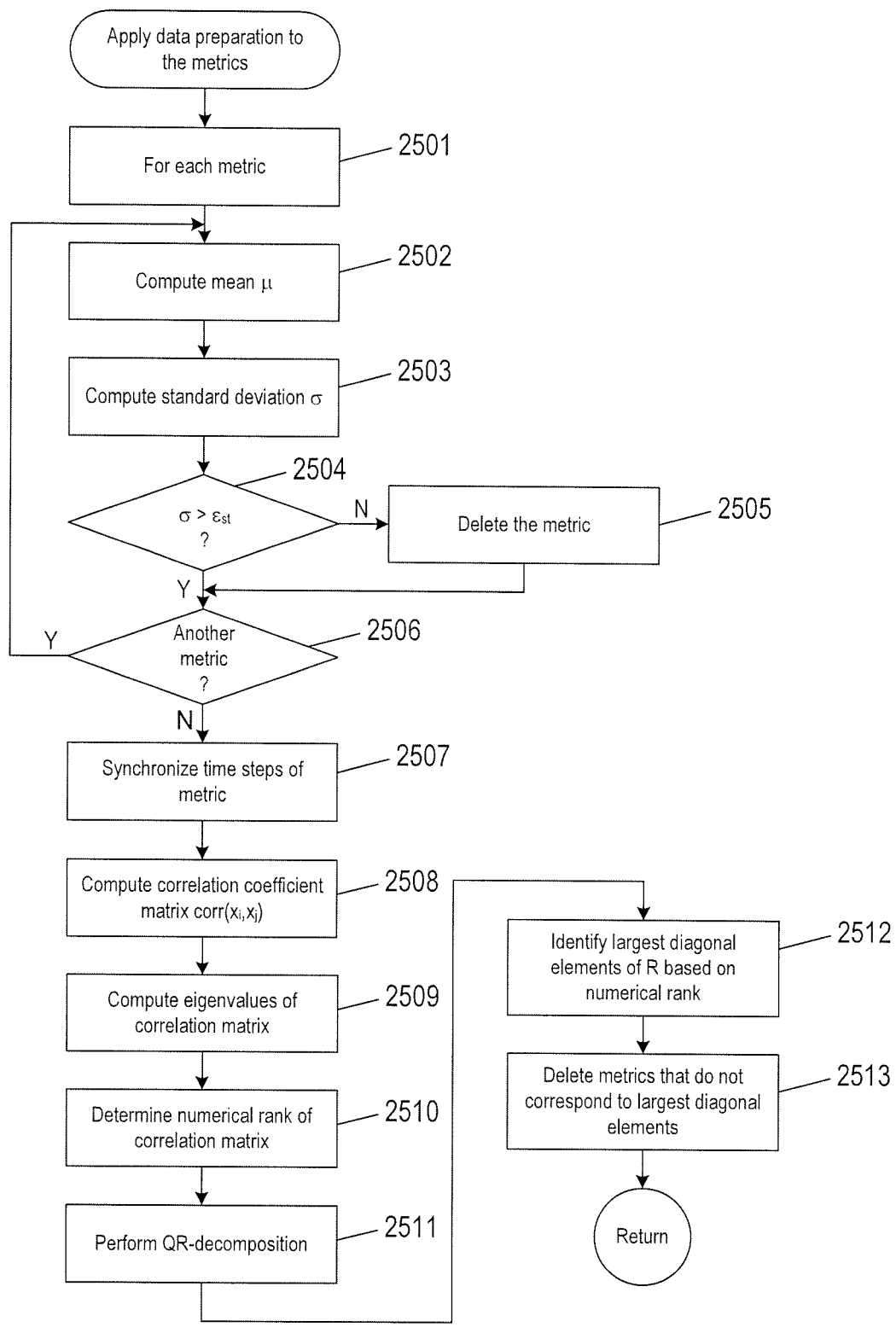
FIG. 25 shows a control-flow diagram of the routine "apply data preparation to the metrics" called in FIG. 24.

FIG. 25 shows a control-flow diagram of the routine "apply data preparation to the metrics" called in block 2402 of FIG. 24. A loop beginning with block 2501 repeats the operations represented by blocks 2502-2506 for each metric associated with the object. In block 2502, a mean is computed for the metric. In block 2503, a standard deviation is computed based on the metric and the mean computed in block 2502. In block 2504, when the standard deviation is less than a standard deviation threshold, control flows to block 2505. In block 2505, the metric is deleted and not used to below. In block 2506, the operations represented by blocks 2502-2505 are repeated for another metric. In block 2507, each metric is synchronized to a general set of uniformly spaced time stamps, as described above with reference to FIG. 16B. In block 2508, correlation matrix is computed for each pair of metrics as described above with reference to Equation (6) and FIG. 17. In block 2509, eigenvalues are computed for the correlation matrix. In block 2510, a numerical rank is determined for the correlation matrix based on the eigenvalues. In block 2511, QR decomposition is performed on the correlation matrix, as described above with reference to Equations (8a)-(8d) to obtain a diagonal R matrix. In block 2512, largest diagonal elements of the R matrix are identified based on the numerical rank. In block 2513, metrics that do not correspond to the largest diagonal elements of the R matrix are deleted from further consideration below.

Figure 26:
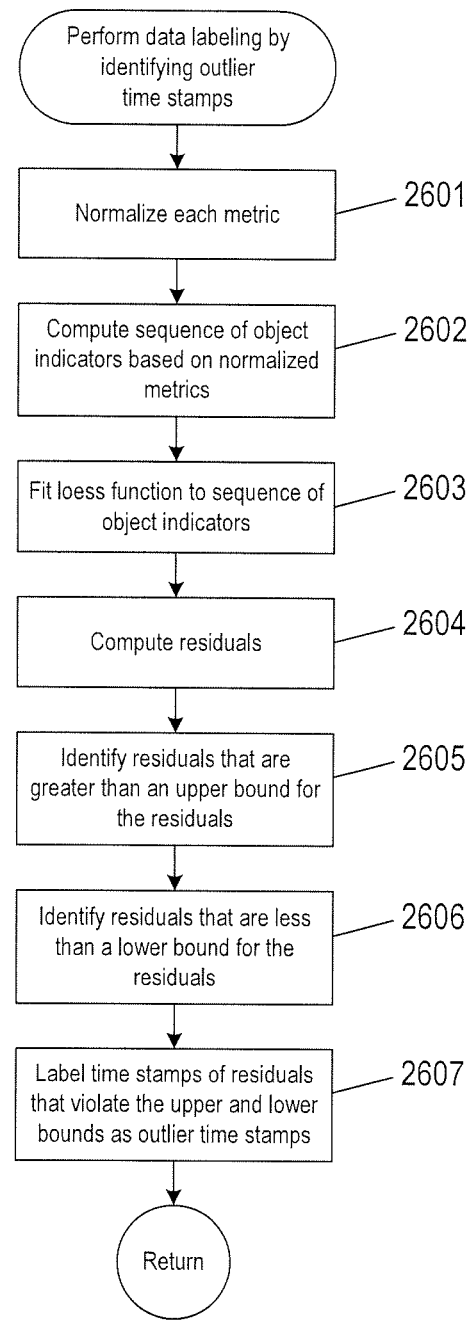
FIG. 26 shows a control-flow diagram of the routine "perform data labelling by identifying outlier time stamps" called in FIG. 24.

FIG. 26 shows a control-flow diagram of the routine "perform data labelling by identifying outlier time stamps" called in block 2403 of FIG. 24. In block 2601, each metric is normalized as described above with reference to Equation (10). In block 2602, a indicator metric is computed according to one of the object indicators described above with reference to Equations (11a)-(11d) and FIG. 19A. In block 2603, a loess function is fit to the indicator metric as described above with reference to Equations (12)-(14) and FIG. 19B. In block 2604, a sequence of residuals is computed as described above with reference to Equation (15) and FIG. 19C. In block 1605, residuals are compared to upper and lower bounds. Residuals that violate the upper and lower bounds are identified as outlier residuals as described above with reference to FIG. 19D. In block 1906, time stamps of the outlier residuals are identified as outlier time stamps as described above with reference to FIGS. 19D and 19E.

Figure 27:
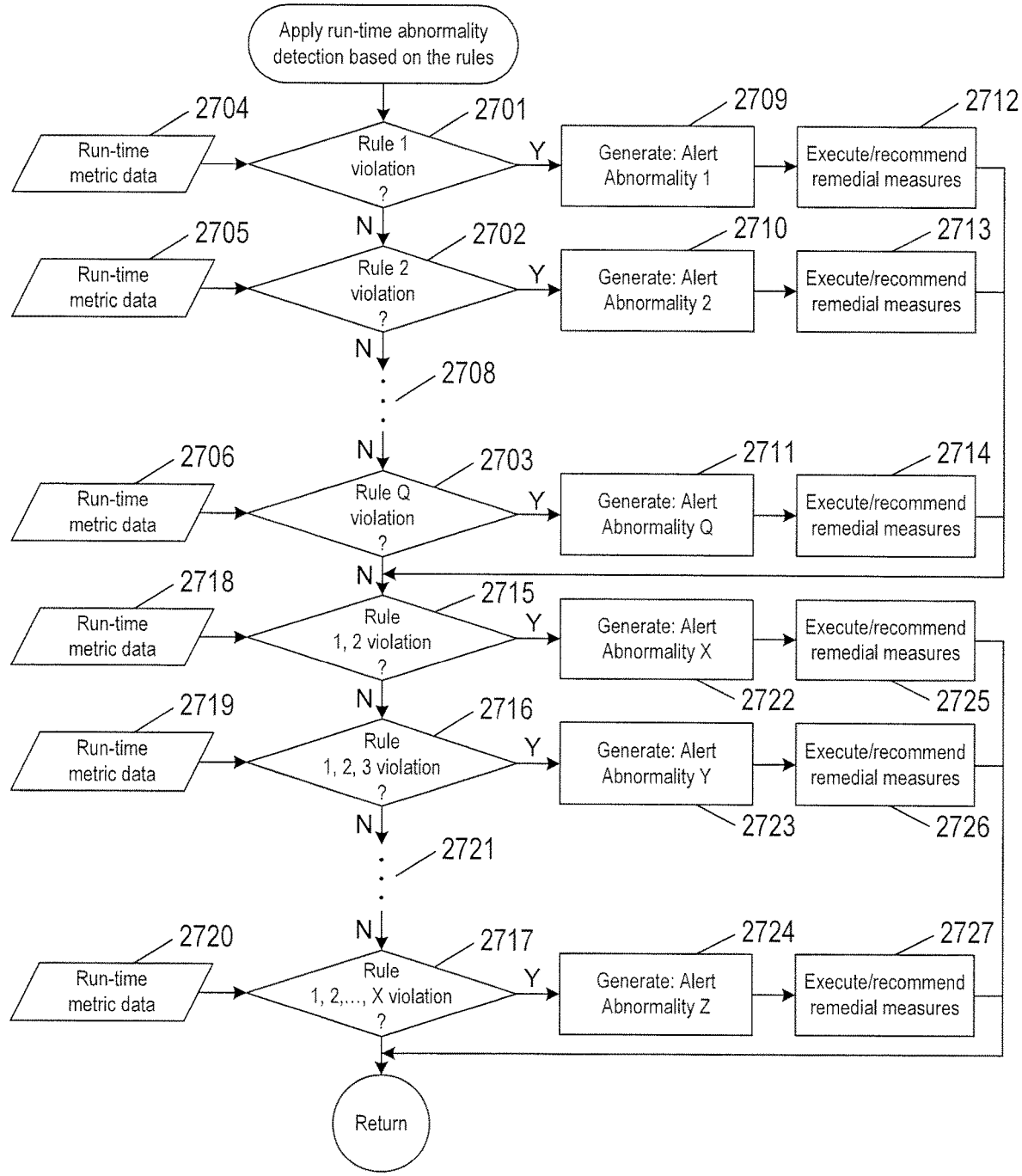
FIG. 27 shows a control-flow diagram of the routine "apply run-time abnormality detection based on the rules" called in FIG. 24.

FIG. 27 shows a control-flow diagram of the routine "apply run-time abnormality detection based on the rules" called in block 2405 of FIG. 24. In decision blocks, 2701, 2701, and 2703 rules are applied to run-time metric data 2704, 2705, and 2706, respectively. Ellipsis 2708 represents rules (not shown) applied to the run-time metric data. When one of the rules represented by decision blocks 2701, 2702, and 2703 are violated, control flows to corresponding blocks 2709, 2710, and 2711, in which a corresponding alert identifying the abnormality associated with the rule violation is generated as described above with reference to FIGS. 21 and 22. In blocks 2712, 2713, and 2714, remedial measures are provided or executed to correct the abnormal behavior of the object. In decision blocks, 2715, 2716, and 2717 combinations of rules are applied to the run-time metric data 2718, 2719, and 2720, respectively. Ellipsis 2721 represents combinations of rules (not shown) associated with combinations of run-time metric data. When one of the rules represented by decision blocks 2715, 2716, and 2717 are violated, control flows to corresponding blocks 2722, 2723, and 2724, in which a corresponding alert identifying the abnormality associated with combinations of rule violations is generated as described above with reference to FIG. 23. In blocks 2725, 2726, and 2727, remedial measures are provided or executed to correct the abnormal behavior of object.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process stored in one or more data-storage devices and executed using one or more processors of a computer system for detecting abnormally behaving objects of a distributed computing system, the improvement comprising:
   identifying a set of metrics associated with an object of a distributed computing system;
   labelling time stamps of outlier metric values of the set of metrics as outlier time stamps;
   computing rules based on the set of metrics and the outlier time stamps, each rule able to identify a type of abnormal behavior exhibited by the object;
   applying the rules to run-time metric data of the set of metrics to detect run-time abnormal behavior of the object; and
   executing remedial measures to correct the abnormal behavior of the object when at least one of the rules has been violated by the run-time metric data.

2. The process of claim 1 further comprising:
   deleting constant and nearly constant metrics from the set of metrics;
   synchronizing the set of metrics to a general sequence of time steps; and
   deleting correlated metrics from the set of metrics.

3. The process of claim 2 wherein deleting the constant and nearly constant metrics in the set of metrics comprises:
   computing a standard deviation for each metric in the set of metric data; and
   deleting each metric with a standard deviation less than a standard deviation threshold.

4. The process of claim 2 wherein deleting the correlated metrics from the set of metrics comprises:
   computing a correlation matrix for the sets of metrics;
   determining eigenvalues of the correlation matrix;
   determining numerical rank of the correlation matrix based on the eigenvalues;
   decomposing the correlation matrix into a Q matrix and an R matrix;
   identifying a largest number of diagonal elements of the R matrix, the largest number of diagonal elements equal to the numerical rank; and
   deleting the metrics from sets of metric data that do not correspond to the diagonal elements.

5. The process of claim 1 wherein labelling the time stamps of the outlier metric values of the metrics as the outlier time stamps comprises:
   normalizing each metric to obtain a normalized set of metrics;
   computing an indicator metric from the normalized set of metrics;
   fitting a loess function to the indicator metric;
   computing a sequence of residuals based on differences between the loess function and the indicator metric;
   identifying residuals in the sequence of residuals that violate an upper bound or a lower bound for object indicator values as outlier residuals; and
   identifying time stamps of the outlier residuals as outlier time stamps.

6. The process of claim 1 wherein applying the rules to the run-time metric data of the metrics to detect run-time abnormal behavior of the object comprises:
   for each metric
      comparing run-time metric values to a rule associated with the metric;
      identifying run-time metric values that violate the rules as run-time outlier metric values; and
      generating an alert displayed on an administration console when the run-time outlier metric values are detected.

7. The process of claim 1 wherein applying the rules to the run-time metric data of the metrics to detect run-time abnormal behavior of the object comprises:
   for each of combination of metrics
      comparing run-time metric values of each metric in the combination of metrics to a rule associated with the metric;
      identifying run-time metric values that violate the rules as run-time outlier metric values; and
      generating an alert displayed on an administration console when the run-time outlier metric values for the combination of metrics are detected.

8. A computer system for detecting abnormally behaving objects of a distributed computing system, the system comprising:
   one or more processors;
   one or more data-storage devices; and
   machine-readable instructions stored in the one or more data-storage devices that when executed using the one or more processors controls the system to execute operations comprising:
      identifying a set of metrics associated with an object of a distributed computing system;
      labelling time stamps of outlier metric values of the metrics as outlier time stamps;
      computing rules based on the set of metrics and the outlier time stamps, each rule able to identify a type of abnormal behavior exhibited by the object;
      applying the rules to run-time metric data of the set of metrics to detect run-time abnormal behavior of the object; and
      executing remedial measures to correct the abnormal behavior of the object, when at least one of the rules has been violated by the run-time metric data.

9. The computer system of claim 8 further comprising:
   deleting constant and nearly constant metrics from the set of metrics;
   synchronizing the set of metrics to a general sequence of time steps; and
   deleting correlated metrics from the set of metrics.

10. The computer system of claim 9 wherein deleting the constant and nearly constant metrics in the set of metrics comprises:
    computing a standard deviation for each metric in the set of metric data; and
    deleting each metric with a standard deviation less than a standard deviation threshold.

11. The computer system of claim 9 wherein deleting the correlated metrics from the set of metrics comprises:
    computing a correlation matrix tor the sets of metrics;
    determining eigenvalues of the correlation matrix;
    determining numerical rank of the correlation matrix based on the eigenvalues;
    decomposing the correlation matrix into a Q matrix and an R matrix;
    identifying a largest number of diagonal elements of the R matrix, the largest number of diagonal elements equal to the numerical rank; and
    deleting the metrics from sets of metric data that do not correspond to the diagonal elements.

12. The computer system of claim 8 wherein labelling the time stamps of the outlier metric values of the metrics as the outlier time stamps comprises:
  normalizing each metric to obtain a normalized set of metrics;
  computing a indicator metric from the normalized set of metrics;
  fitting a loess function to the indicator metric;
  computing a sequence of residuals based on differences between the loess function and the indicator metric;
  identifying residuals in the sequence of residuals that violate an upper bound or a lower bound for object indicator values as outlier residuals; and
  identifying time stamps of the outlier residuals as outlier time stamps.

13. The computer system of claim 8 wherein applying the rules to the run-time metric data of the metrics to detect run-time abnormal behavior of the object comprises:
  for each metric
    comparing run-time metric values to a rule associated with the metric;
    identifying run-time metric values that violate the rules as run-time outlier metric values; and
    generating an alert displayed on an administration console when the run-time outlier metric values are detected.

14. The computer system of claim 8 wherein applying the rules to the run-time metric data of the metrics to detect run-time abnormal behavior of the object comprises:
  for each of combination of metrics
    comparing run-time metric values of each metric in the combination of metrics to a rule associated with the metric;
    identifying run-time metric values that violate the rules as run-time outlier metric values; and
    generating an alert displayed on an administration console when the run-time outlier metric values for the combination of metrics are detected.

15. A non-transitory computer-readable medium encoded with machine-readable instructions for enabling one or more processors of a computer system to execute operations comprising:
  identifying a set of metrics associated with an object of a distributed computing system;
  labelling time stamps of outlier metric values of the set of metrics as outlier time stamps;
  computing rules based on the set of metrics and the outlier time stamps, each rule able to identify a type of abnormal behavior exhibited by the object;
  applying the rules to run-time metric data of the set of metrics to detect run-time abnormal behavior of the object; and
  executing remedial measures to correct the abnormal behavior of the object when at least one of the rules has been violated by the run-time metric data.

16. The medium of claim 15 further comprising:
  deleting constant and nearly constant metrics from the set of metrics;
  synchronizing the set of metrics to a general sequence of time steps; and
  deleting correlated metrics from the set of metrics.

17. The medium of claim 16 wherein deleting the constant and nearly constant metrics in the set of metrics comprises:
  computing a standard deviation for each metric in the set of metric data; and
  deleting each metric with a standard deviation less than a standard deviation threshold.

18. The medium of claim 16 wherein deleting the correlated metrics from the set of metrics comprises:
  computing a correlation matrix for the sets of metrics;
  determining eigenvalues of the correlation matrix;
  determining numerical rank of the correlation matrix based on the eigenvalues;
  decomposing the correlation matrix into a Q matrix and an R matrix;
  identifying a largest number of diagonal elements of the R matrix, the largest number of diagonal elements equal to the numerical rank; and
  deleting the metrics from sets of metric data that do not correspond to the diagonal elements.

19. The medium of claim 15 wherein labelling the time stamps of the outlier metric values of the metrics as the outlier time stamps comprises:
  normalizing each metric to obtain a normalized set of metrics;
  computing a indicator metric from the normalized set of metrics;
  fitting a loess function to the indicator metric;
  computing a sequence of residuals based on differences between the loess function and the indicator metric;
  identifying residuals in the sequence of residuals that violate an upper bound or a lower bound for object indicator values as outlier residuals; and
  identifying time stamps of the outlier residuals as outlier time stamps.

20. The medium of claim 15 wherein applying the rules to the run-time metric data of the metrics to detect run-time abnormal behavior of the object comprises:
  for each metric
    comparing run-time metric values to a rule associated with the metric;
    identifying run-time metric values that violate the rules as run-time outlier metric values; and
    generating an alert displayed on an administration console when the run-time outlier metric values are detected.

21. The medium of claim 15 wherein applying the rules to the run-time metric data of the metrics to detect run-time abnormal behavior of the object comprises:
  for each of combination of metrics
    comparing run-time metric values of each metric in the combination of metrics to a rule associated with the metric;
    identifying run-time metric values that violate the rules as run-time outlier metric values; and
    generating an alert displayed on an administration console when the run-time outlier metric values for the combination of metrics are detected.

* * * * *